US012581506B2

(12) United States Patent
MolavianJazi et al.

(10) Patent No.: US 12,581,506 B2
(45) Date of Patent: Mar. 17, 2026

(54) DCI SIZE ALIGNMENT FOR A SCHEDULED CELL WITH MULTIPLE SCHEDULING CELLS

(71) Applicant: Samsung Electronics Co., Ltd., Suwon-si (KR)

(72) Inventors: Ebrahim MolavianJazi, San Jose, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 18/350,631

(22) Filed: Jul. 11, 2023

(65) Prior Publication Data

US 2024/0032062 A1     Jan. 25, 2024

Related U.S. Application Data

(60) Provisional application No. 63/392,005, filed on Jul. 25, 2022.

(51) Int. Cl.
H04W 72/232     (2023.01)
H04W 16/32     (2009.01)
H04W 72/1268     (2023.01)

(52) U.S. Cl.
CPC ......... *H04W 72/232* (2023.01); *H04W 16/32* (2013.01); *H04W 72/1268* (2013.01)

(58) Field of Classification Search
CPC ..... H04L 1/0008; H04L 5/001; H04L 5/0032; H04L 5/0053; H04L 5/0098; H04W 16/32;

(Continued)

(56) References Cited

U.S. PATENT DOCUMENTS 10,925,084 B2 * 2/2021 Aiba ..................... H04W 72/23
10,952,199 B2 * 3/2021 Kim ..................... H04L 5/0094
(Continued)

FOREIGN PATENT DOCUMENTS

CA     3138219 A1 * 11/2020     ........... H04W 72/23
CA     3138219 C * 5/2024     ........... H04L 5/0048
(Continued)

OTHER PUBLICATIONS

International Search Report and Written Opinion issued Oct. 20, 2023 regarding International Application No. PCT/KR2023/010533, 7 pages.

(Continued)

*Primary Examiner* — Eric Nowlin

(57)     ABSTRACT

Downlink control information (DCI) size alignment for a scheduled cell with multiple scheduling cells. A includes receiving: first information for first fields of a first DCI format when on a primary cell (PCell) and second information for second fields of the first DCI format when on a secondary cell (SCell). The method further includes determining: a first size for the first DCI format on the PCell, a second size for the first DCI format on the SCell, and a first number of padding bits equal to an absolute difference between the first size and the second size. When the SCell is deactivated, the second size is determined based on a first reference downlink (DL) bandwidth part (BWP) for the SCell. The method further includes receiving the first DCI format in a physical downlink control channel (PDCCH) reception on the PCell or the SCell.

20 Claims, 6 Drawing Sheets

(58) Field of Classification Search
    CPC ............. H04W 36/0069; H04W 36/06; H04W
                72/0453; H04W 72/0457; H04W 72/1268;
                H04W 72/232; H04W 76/15; H04W
                                                    76/27
    See application file for complete search history.

(56)                    References Cited

U.S. PATENT DOCUMENTS

| | | | | | |
|---|---|---|---|---|---|
| 11,191,071 | B2 * | 11/2021 | Yi | ......................... | H04W 72/23 |
| 11,233,601 | B2 * | 1/2022 | Salah | ...................... | H04L 1/003 |
| 11,239,939 | B2 * | 2/2022 | Papasakellariou | .... | H04L 1/0006 |
| 11,330,579 | B2 * | 5/2022 | Guo | .......................... | H04L 5/00 |
| 11,405,915 | B2 * | 8/2022 | Nam | ...................... | H04W 72/23 |
| 11,463,227 | B2 * | 10/2022 | Hsieh | ...................... | H04L 5/001 |
| 11,470,603 | B2 * | 10/2022 | Kim | ......................... | H04L 5/001 |
| 11,558,144 | B2 * | 1/2023 | Yang | .................... | H04W 76/11 |
| 11,582,014 | B2 * | 2/2023 | Tsai | ...................... | H04L 5/0098 |
| 11,611,411 | B2 * | 3/2023 | Xu | ........................ | H04W 72/23 |
| 11,617,195 | B2 * | 3/2023 | Huang | ................. | H04L 5/0053 |
| | | | | | 370/329 |
| 11,622,374 | B2 * | 4/2023 | Yi | ..................... | H04W 72/0466 |
| | | | | | 370/254 |
| 11,627,600 | B2 * | 4/2023 | Yi | ........................ | H04W 76/11 |
| | | | | | 370/254 |
| 11,652,568 | B2 * | 5/2023 | Papasakellariou | .... | H04W 72/53 |
| | | | | | 370/329 |
| 11,671,974 | B2 * | 6/2023 | Lee | ...................... | H04L 1/0072 |
| | | | | | 370/336 |
| 11,695,500 | B2 * | 7/2023 | Chen | .................... | H04L 1/0039 |
| | | | | | 370/330 |
| 11,737,107 | B2 * | 8/2023 | Yi | ........................ | H04W 72/23 |
| | | | | | 370/329 |
| 11,777,695 | B2 * | 10/2023 | Kim | .................. | H04W 52/0229 |
| | | | | | 370/329 |
| 11,792,790 | B2 * | 10/2023 | Shi | ........................ | H04W 76/27 |
| | | | | | 370/329 |
| 11,832,285 | B2 * | 11/2023 | Park | ...................... | H04W 76/11 |
| 11,882,565 | B2 * | 1/2024 | Mukherjee | ........ | H04W 72/0453 |
| 11,889,515 | B2 * | 1/2024 | Yao | .................. | H04W 72/0453 |
| 11,985,671 | B2 * | 5/2024 | Huang | ................. | H04W 24/08 |
| 12,035,301 | B2 * | 7/2024 | Takeda | .................. | H04W 72/23 |
| 12,063,104 | B2 * | 8/2024 | Suzuki | ................. | H04L 5/0053 |
| 12,063,671 | B2 * | 8/2024 | Lin | ...................... | H04W 72/23 |
| 12,075,268 | B2 * | 8/2024 | Chatterjee | ......... | H04W 72/0446 |
| 12,081,334 | B2 * | 9/2024 | Luo | ....................... | H04L 5/0053 |
| 12,101,782 | B2 * | 9/2024 | Yi | ........................ | H04W 72/23 |
| 12,114,264 | B2 * | 10/2024 | Guo | ..................... | H04W 72/23 |
| 12,120,666 | B2 * | 10/2024 | MolavianJazi | ....... | H04W 76/28 |
| 12,133,235 | B2 * | 10/2024 | Ying | .................... | H04L 1/1864 |
| 12,207,267 | B2 * | 1/2025 | Xu | ......................... | H04L 5/001 |
| 12,238,729 | B2 * | 2/2025 | Kittichokechai | ..... | H04L 5/0053 |
| 12,341,716 | B2 * | 6/2025 | Fu | ......................... | H04W 72/23 |
| 12,438,685 | B2 * | 10/2025 | Nory | ...................... | H04L 5/001 |
| 2015/0271758 | A1 | 9/2015 | Park | | |
| 2016/0219557 | A1 | 7/2016 | He et al. | | |
| 2017/0353285 | A1 * | 12/2017 | Yang | ........................ | H04L 5/00 |
| 2018/0077736 | A1 | 3/2018 | Pelletier et al. | | |
| 2019/0159241 | A1 * | 5/2019 | Aiba | ...................... | H04J 11/00 |
| 2019/0297604 | A1 * | 9/2019 | Lee | ...................... | H04L 1/0072 |
| 2019/0297605 | A1 * | 9/2019 | Kim | ...................... | H04W 72/23 |
| 2019/0342907 | A1 * | 11/2019 | Huang | ................. | H04W 72/23 |
| 2020/0029330 | A1 * | 1/2020 | Nam | .................... | H04L 5/0094 |
| 2020/0045708 | A1 * | 2/2020 | Hwang | ..................... | H04L 5/10 |
| 2020/0304230 | A1 * | 9/2020 | Papasakellariou | .... | H04L 5/0094 |
| 2020/0328840 | A1 * | 10/2020 | Salah | .................. | H04W 24/08 |
| 2020/0337029 | A1 * | 10/2020 | Yi | ........................ | H04W 72/23 |
| 2021/0050987 | A1 * | 2/2021 | Hsieh | ................... | H04W 72/23 |
| 2021/0067267 | A1 * | 3/2021 | Chen | .................... | H04L 5/001 |
| 2021/0152274 | A1 * | 5/2021 | Yang | .................... | H04L 5/0091 |
| 2021/0153228 | A1 * | 5/2021 | Shi | ..................... | H04W 72/569 |
| 2021/0160035 | A1 * | 5/2021 | Kittichokechai | ..... | H04W 72/23 |
| 2021/0176012 | A1 * | 6/2021 | Xu | ........................ | H04W 72/23 |
| 2021/0176029 | A1 * | 6/2021 | Tsai | .................... | H04B 7/0626 |
| 2021/0176030 | A1 * | 6/2021 | Tsai | .................. | H04W 72/0453 |
| 2021/0204258 | A1 * | 7/2021 | Kim | ...................... | H04L 5/0053 |
| 2021/0242955 | A1 * | 8/2021 | Suzuki | .................. | H04W 72/23 |
| 2021/0243767 | A1 * | 8/2021 | Suzuki | .................. | H04L 5/0007 |
| 2021/0250156 | A1 * | 8/2021 | Kim | ...................... | H04W 72/23 |
| 2021/0250918 | A1 * | 8/2021 | Liu | ....................... | H04W 72/20 |
| 2021/0258993 | A1 | 8/2021 | Takeda et al. | | |
| 2021/0274476 | A1 * | 9/2021 | Yi | ......................... | H04W 24/08 |
| 2021/0274477 | A1 * | 9/2021 | Yi | ......................... | H04W 76/27 |
| 2021/0274535 | A1 * | 9/2021 | Yi | ......................... | H04W 24/08 |
| 2021/0314953 | A1 * | 10/2021 | Park | ...................... | H04W 80/02 |
| 2021/0329677 | A1 * | 10/2021 | Huang | ............. | H04W 52/0206 |
| 2021/0368509 | A1 * | 11/2021 | Lin | ....................... | H04W 24/08 |
| 2022/0046662 | A1 * | 2/2022 | Takeda | ............. | H04W 72/1263 |
| 2022/0053542 | A1 * | 2/2022 | Xu | ..................... | H04W 52/0229 |
| 2022/0116143 | A1 * | 4/2022 | Luo | ...................... | H04L 1/0079 |
| 2022/0124786 | A1 * | 4/2022 | Mukherjee | ........... | H04W 72/23 |
| 2022/0124788 | A1 * | 4/2022 | Kittichokechai | ..... | H04L 1/0008 |
| 2022/0158754 | A1 * | 5/2022 | Papasakellariou | .... | H04W 72/23 |
| 2022/0159631 | A1 * | 5/2022 | Yi | ......................... | H04W 72/23 |
| 2022/0167320 | A1 * | 5/2022 | Lee | ...................... | H04L 1/1671 |
| 2022/0201515 | A1 * | 6/2022 | Chatterjee | ............. | H04L 5/0091 |
| 2022/0217559 | A1 * | 7/2022 | Nory | ................. | H04W 52/0229 |
| 2022/0240187 | A1 * | 7/2022 | Guo | ................. | H04W 76/30 |
| 2022/0345921 | A1 * | 10/2022 | Liu | ...................... | H04L 5/0053 |
| 2022/0360385 | A1 * | 11/2022 | Fu | ........................ | H04L 5/0044 |
| 2022/0377785 | A1 * | 11/2022 | Yao | .................. | H04W 72/0453 |
| 2022/0386363 | A1 * | 12/2022 | Ying | .................... | H04L 1/1896 |
| 2022/0394734 | A1 * | 12/2022 | MolavianJazi | ... | H04W 72/0446 |
| 2023/0224891 | A1 * | 7/2023 | Noh | ........................ | H04L 5/005 |
| | | | | | 370/329 |
| 2023/0254857 | A1 * | 8/2023 | Moon | .................... | H04B 17/24 |
| | | | | | 370/329 |
| 2023/0262700 | A1 * | 8/2023 | Liu | ..................... | H04W 72/232 |
| | | | | | 370/329 |
| 2024/0057114 | A1 * | 2/2024 | Lei | ...................... | H04W 72/121 |
| 2024/0195549 | A1 * | 6/2024 | Han | .................. | H04L 5/0053 |
| 2024/0406987 | A1 * | 12/2024 | Lin | ...................... | H04W 72/53 |
| 2025/0133572 | A1 * | 4/2025 | Zhao | ........................ | H04W 4/06 |
| 2025/0220683 | A1 * | 7/2025 | Liang | .................... | H04W 72/12 |

FOREIGN PATENT DOCUMENTS

| | | | | | |
|---|---|---|---|---|---|
| CN | 112119606 | A | * | 12/2020 | ............. H04W 72/23 |
| CN | 113841430 | A | * | 12/2021 | ........ H04W 72/0453 |
| CN | 115804219 | A | * | 3/2023 | ........... H04L 1/0079 |
| CN | 116208921 | A | * | 6/2023 | ........ H04W 72/0453 |
| CN | 112119606 | B | * | 12/2023 | ............ H04L 5/0044 |
| CN | 117413613 | A | * | 1/2024 | ............ H04W 72/23 |
| EP | 3907919 | A2 | * | 11/2021 | ............ H04W 72/23 |
| EP | 4181445 | A1 | * | 5/2023 | ........... H04L 1/0079 |
| EP | 3907919 | B1 | * | 10/2023 | ........ H04W 52/0206 |
| EP | 4391676 | A1 | * | 6/2024 | ........ H04W 72/0453 |
| JP | 2024531285 | A | * | 8/2024 | ........ H04W 72/0453 |
| JP | 7741970 | B2 | * | 9/2025 | |
| KR | 20220007514 | A | * | 1/2022 | ........... H04L 1/0079 |
| KR | 20240039062 | A | * | 3/2024 | ........ H04W 72/0453 |
| WO | WO-2019215706 | A1 | * | 11/2019 | ............ H04W 72/23 |
| WO | 2021206921 | A1 | | 10/2021 | |
| WO | WO-2022010132 | A1 | * | 1/2022 | ........... H04L 1/0079 |
| WO | 2022029316 | A1 | | 2/2022 | |
| WO | 2022151348 | A1 | | 7/2022 | |
| WO | WO-2022255796 | A1 | * | 12/2022 | ............ H04W 72/23 |
| WO | WO-2023019411 | A1 | * | 2/2023 | ........ H04W 72/0453 |

OTHER PUBLICATIONS

"3rd Generation Partnership Project; Technical Specification Group Radio Access Network; NR; Requirements for support of radio resource management (Release 17)", 3GPP TS 38.133 V17.2.0, Jun. 2021, 3177 pages.
"3rd Generation Partnership Project; Technical Specification Group Radio Access Network; NR; Physical channels and modulation (Release 17)", 3GPP TS 38.211 V17.2.0, Jun. 2022, 136 pages.
"3rd Generation Partnership Project; Technical Specification Group Radio Access Network; NR; Multiplexing and channel coding (Release 17)", 3GPP TS 38.212 V17.2.0, Jun. 2022, 201 pages.

(56)                    References Cited

OTHER PUBLICATIONS

"3rd Generation Partnership Project; Technical Specification Group Radio Access Network; NR; Physical layer procedures for control (Release 17)", 3GPP TS 38.213 V17.2.0, Jun. 2022, 256 pages.

"3rd Generation Partnership Project; Technical Specification Group Radio Access Network; NR; Physical layer procedures for data (Release 17)," 3GPP TS 38.214 V17.2.0 , Jun. 2022, 228 pages.

"5G; NR; Medium Access Control (MAC) protocol specification (3GPP TS 38.321 version 17.1.0 Release 17)", ETSI TS 138 321 V17.1.0 , Aug. 2022, 244 pages.

"5G; NR; Radio Resource Control (RRC); Protocol specification (3GPP TS 38.331 version 17.1.0 Release 17)", ETSI TS 138 331 V17.1.0, Aug. 2022, 1257 pages.

"5G; NR; NR and NG-RAN Overall description; Stage-2 (3GPP TS 38.300 version 17.1.0 Release 17)", ETSI TS 138 300 V17.1.0, Aug. 2022, 211 pages.

"5G; NR; User Equipment (UE) radio access capabilities (3GPP TS 38.306 version 17.1.0 Release 17)", ETSI TS 138 306 V17.1.0, Aug. 2022, 226 pages.

Extended European Search Report issued Sep. 9, 2025 regarding Application No. 23846917.5, 11 pages.

Vivo, "Remaining issues on Scell scheduling P(S)cell",3GPP TSG RAN WG1 #108-e, R1-2201118, Feb. 2022, 8 pages.

* cited by examiner

Figure 6:
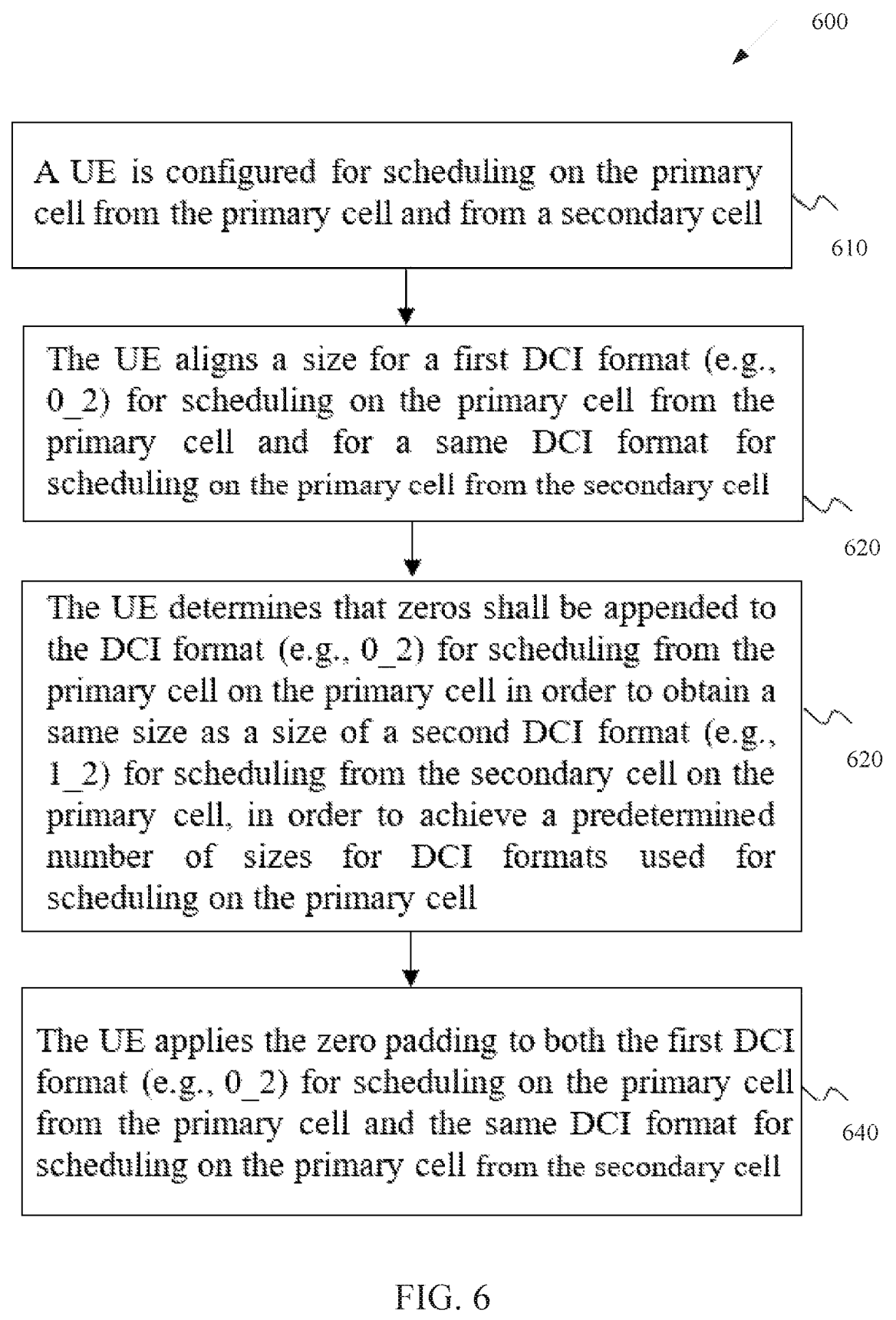

600

A UE is configured for scheduling on the primary cell from the primary cell and from a secondary cell

610

The UE aligns a size for a first DCI format (e.g., 0_2) for scheduling on the primary cell from the primary cell and for a same DCI format for scheduling on the primary cell from the secondary cell

620

The UE determines that zeros shall be appended to the DCI format (e.g., 0_2) for scheduling from the primary cell on the primary cell in order to obtain a same size as a size of a second DCI format (e.g., 1_2) for scheduling from the secondary cell on the primary cell, in order to achieve a predetermined number of sizes for DCI formats used for scheduling on the primary cell

620

The UE applies the zero padding to both the first DCI format (e.g., 0_2) for scheduling on the primary cell from the primary cell and the same DCI format for scheduling on the primary cell from the secondary cell

Figure 7:
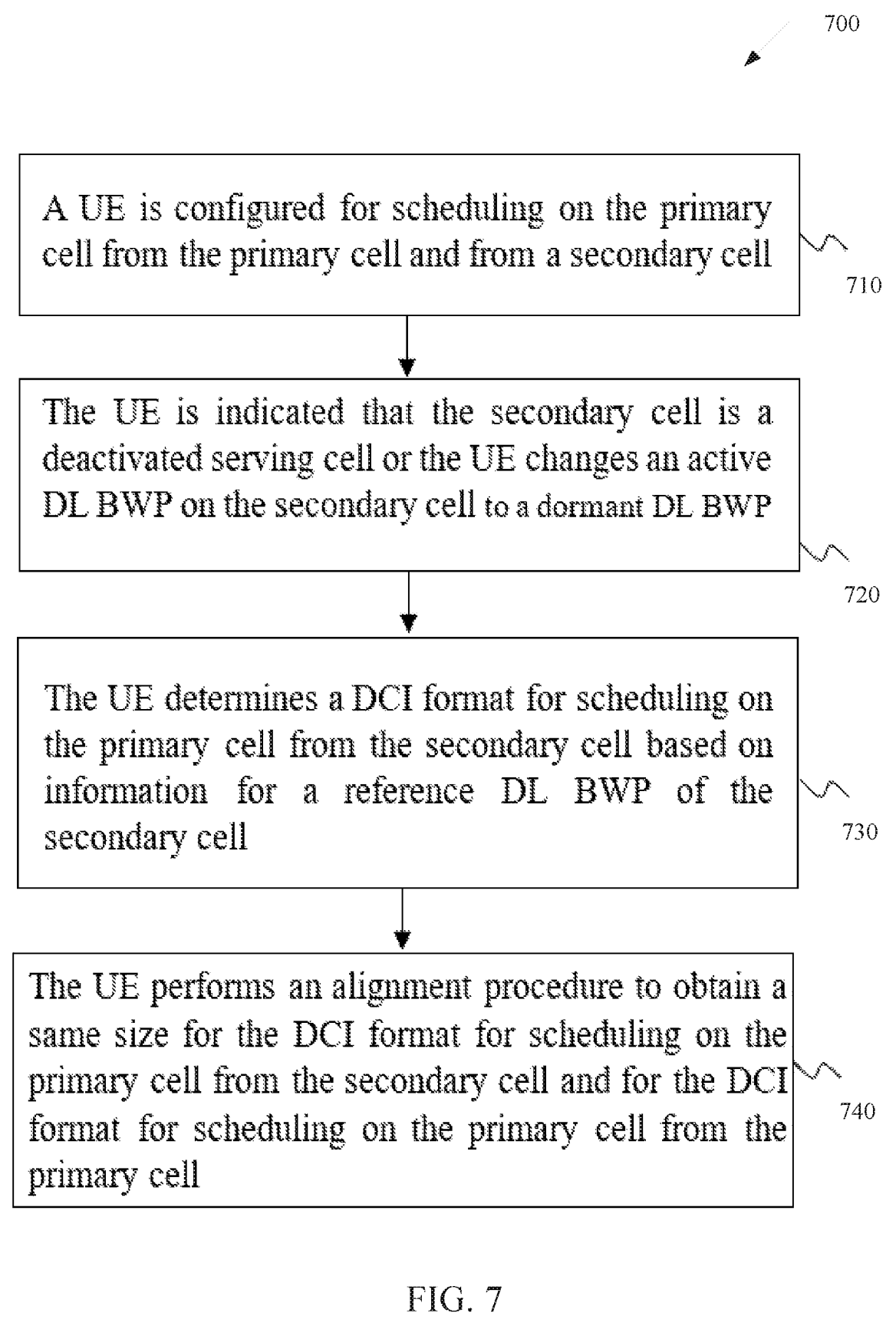

A UE is configured for scheduling on the primary cell from the primary cell and from a secondary cell

710

The UE is indicated that the secondary cell is a deactivated serving cell or the UE changes an active DL BWP on the secondary cell to a dormant DL BWP

720

The UE determines a DCI format for scheduling on the primary cell from the secondary cell based on information for a reference DL BWP of the secondary cell

730

The UE performs an alignment procedure to obtain a same size for the DCI format for scheduling on the primary cell from the secondary cell and for the DCI format for scheduling on the primary cell from the primary cell

DCI SIZE ALIGNMENT FOR A SCHEDULED CELL WITH MULTIPLE SCHEDULING CELLS

CROSS-REFERENCE TO RELATED APPLICATIONS AND CLAIM OF PRIORITY

The present application claims priority to: U.S. Provisional Patent Application No. 63/392,005, filed on Jul. 25, 2023. The contents of the above-identified patent documents are incorporated herein by reference.

TECHNICAL FIELD

The present disclosure relates generally to wireless communication systems and, more specifically, the present disclosure relates to a downlink control information (DCI) size alignment for a scheduled cell with multiple scheduling cells in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a DCI size alignment for a scheduled cell with multiple scheduling cells in a wireless communication system.

In one embodiment, a method is provided. The method includes receiving: first information for first fields of a first DCI format when a first physical downlink control channel (PDCCH) reception providing the first DCI format is on a primary cell (PCell) and second information for second fields of the first DCI format when a second PDCCH reception providing the first DCI format is on a secondary cell (SCell). The first DCI format schedules a physical uplink shared channel (PUSCH) transmission on the PCell. The method further includes determining: a first size for the first DCI format when the first PDCCH reception providing the first DCI format is on the PCell, a second size for the first DCI format when the second PDCCH reception providing the first DCI format is on the SCell, and a first number of padding bits equal to an absolute difference between the first size and the second size. When the SCell is deactivated, the second size is determined based on a first reference downlink (DL) bandwidth part (BWP) for the SCell. The method further includes receiving the first DCI format in the first PDCCH reception on the PCell, where, when the first size is smaller than the second size, the first DCI format includes the first number of padding bits appended to a number of bits for the first fields or receiving the first DCI format in the second PDCCH reception on the SCell, where, when the second size is smaller than the first size, the first DCI format includes the first number of padding bits appended to a number of bits for the second fields.

In another embodiment, a user equipment (UE) is provided. The UE includes a transceiver configured to receive first information for first fields of a first DCI format when a first PDCCH reception providing the first DCI format is on a PCell and second information for second fields of the first DCI format when a second PDCCH reception providing the first DCI format is on a SCell. The first DCI format schedules a PUSCH transmission on the PCell. The UE further includes a processor operably connected to the transceiver. The processor is configured to determine: a first size for the first DCI format when the first PDCCH reception providing the first DCI format is on the PCell, a second size for the first DCI format when the second PDCCH reception providing the first DCI format is on the SCell, and a first number of padding bits equal to an absolute difference between the first size and the second size. When the SCell is deactivated, the second size is determined based on a first reference DL BWP for the SCell. The transceiver is further configured to receive the first DCI format in the first PDCCH reception on the PCell, where, when the first size is smaller than the second size, the first DCI format includes the first number of padding bits appended to a number of bits for the first fields or receive the first DCI format in the second PDCCH reception on the SCell, where, when the second size is smaller than the first size, the first DCI format includes the first number of padding bits appended to a number of bits for the second fields.

In yet another embodiment, a base station is provided. The base station includes a transceiver configured to transmit first information for first fields of a first DCI format when a first PDCCH transmission providing the first DCI format is on a PCell and second information for second fields of the first DCI format when a second PDCCH transmission providing the first DCI format is on a SCell. The first DCI format schedules a PUSCH reception on the PCell. The base station further includes a processor operably connected to the transceiver. The processor is configured to determine: a first size for the first DCI format when the first PDCCH transmission providing the first DCI format is on the PCell, a second size for the first DCI format when the second PDCCH transmission providing the first DCI format is on the SCell, and a first number of padding bits equal to an absolute difference between the first size and the second size. When the SCell is deactivated, the second size is determined based on a first reference DL BWP for the SCell. The transceiver is further configured to transmit: the first DCI format in the first PDCCH transmission on the PCell, where, when the first size is smaller than the second size, the first DCI format includes the first number of padding bits appended to a number of bits for the first fields; or the first DCI format in the second PDCCH transmission on the SCell, where, when the second size is smaller than the first size, the first DCI format includes the first number of padding bits appended to a number of bits for the second fields.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive,"

and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a flowchart of procedure for a UE to align sizes of DCI formats used for scheduling on the primary cell from the primary cell or from a secondary cell when the UE monitors PDCCH for detection of more than "3+1" DCI format sizes according to embodiments of the present disclosure; and FIG. 7 illustrates a flowchart of procedure for a UE to determine a size of a DCI format used for scheduling on the PCell via PDCCH receptions on an SCell when the SCell is deactivated for the UE or the UE has a dormant active DL BWP on the SCell according to embodiments of the present disclosure.

DETAILED DESCRIPTION

FIG. 1 through FIG. 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.133 v17.2.0, "NR; Requirements for support of radio resource management"; 3GPP TS 38.211 v17.2.0, "NR; Physical channels and modulation"; 3GPP TS 38.212 v17.2.0, "NR; Multiplexing and Channel coding"; 3GPP TS 38.213 v17.2.0, "NR; Physical Layer Procedures for Control"; 3GPP TS 38.214 v17.2.0, "NR; Physical Layer Procedures for Data"; 3GPP TS 38.321 v17.1.0, "NR; Medium Access Control (MAC) protocol specification," 3GPP TS 38.331 v17.1.0, "NR; Radio Resource Control (RRC) Protocol Specification"; and 3GPP TS 38.300 Rel-17 v17.1.0, "NR; NR and NG-RAN Overall Description; Stage 2"; and 3GPP TR 38.306 v17.1.0, "NR; User Equipment (UE) radio access capabilities."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
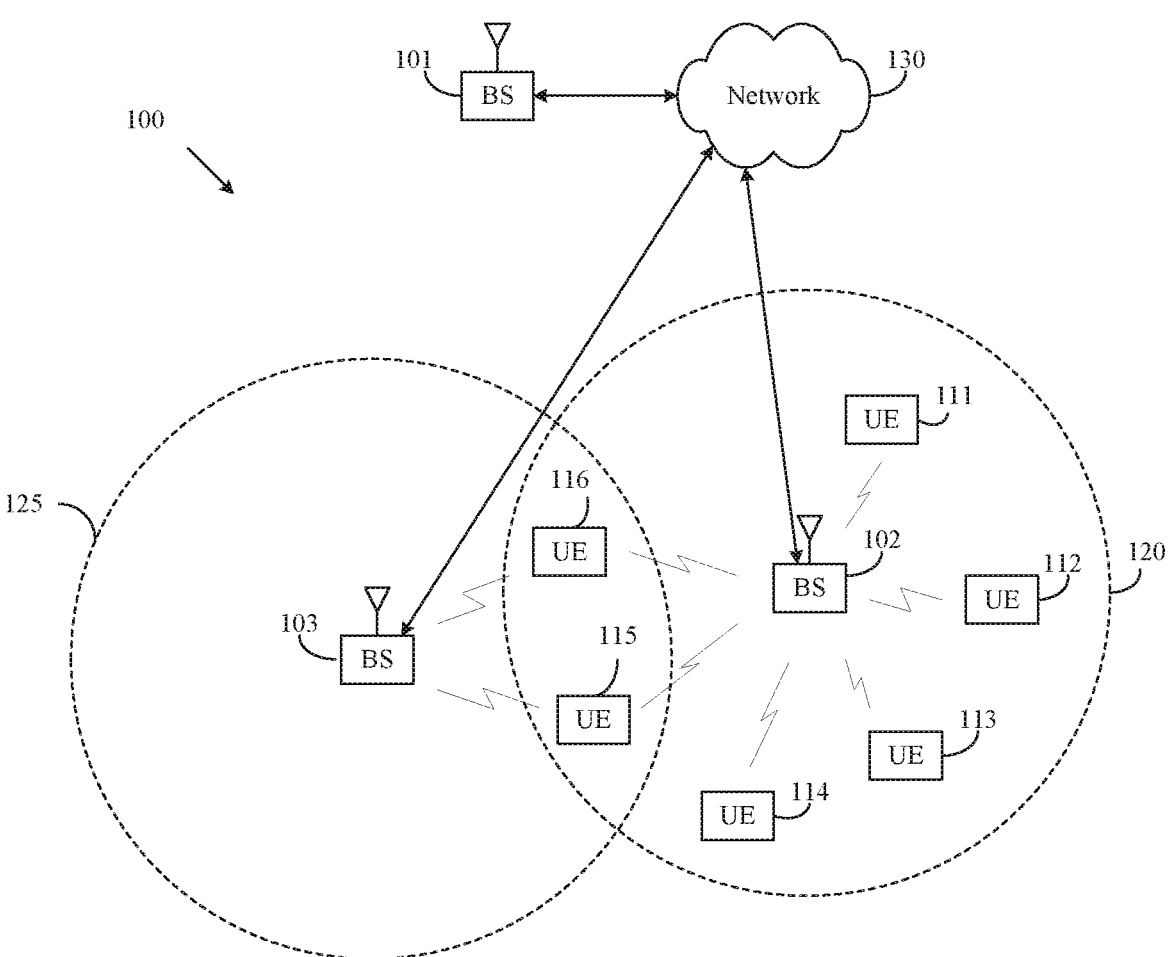
FIG. 1 illustrates an example of wireless network according to embodiments of the present disclosure.
Figure 2:
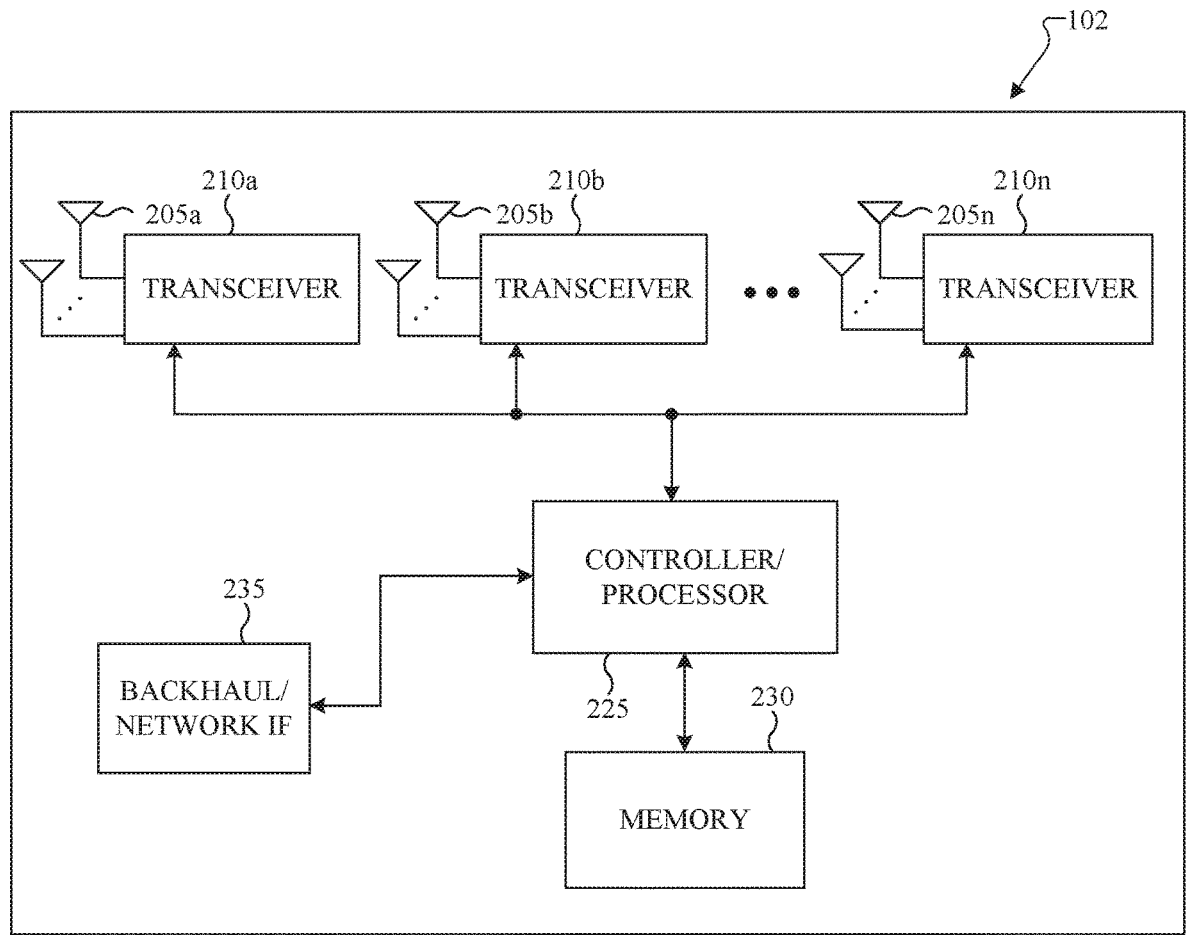
FIG. 2 illustrates an example of gNB according to embodiments of the present disclosure.
Figure 3:
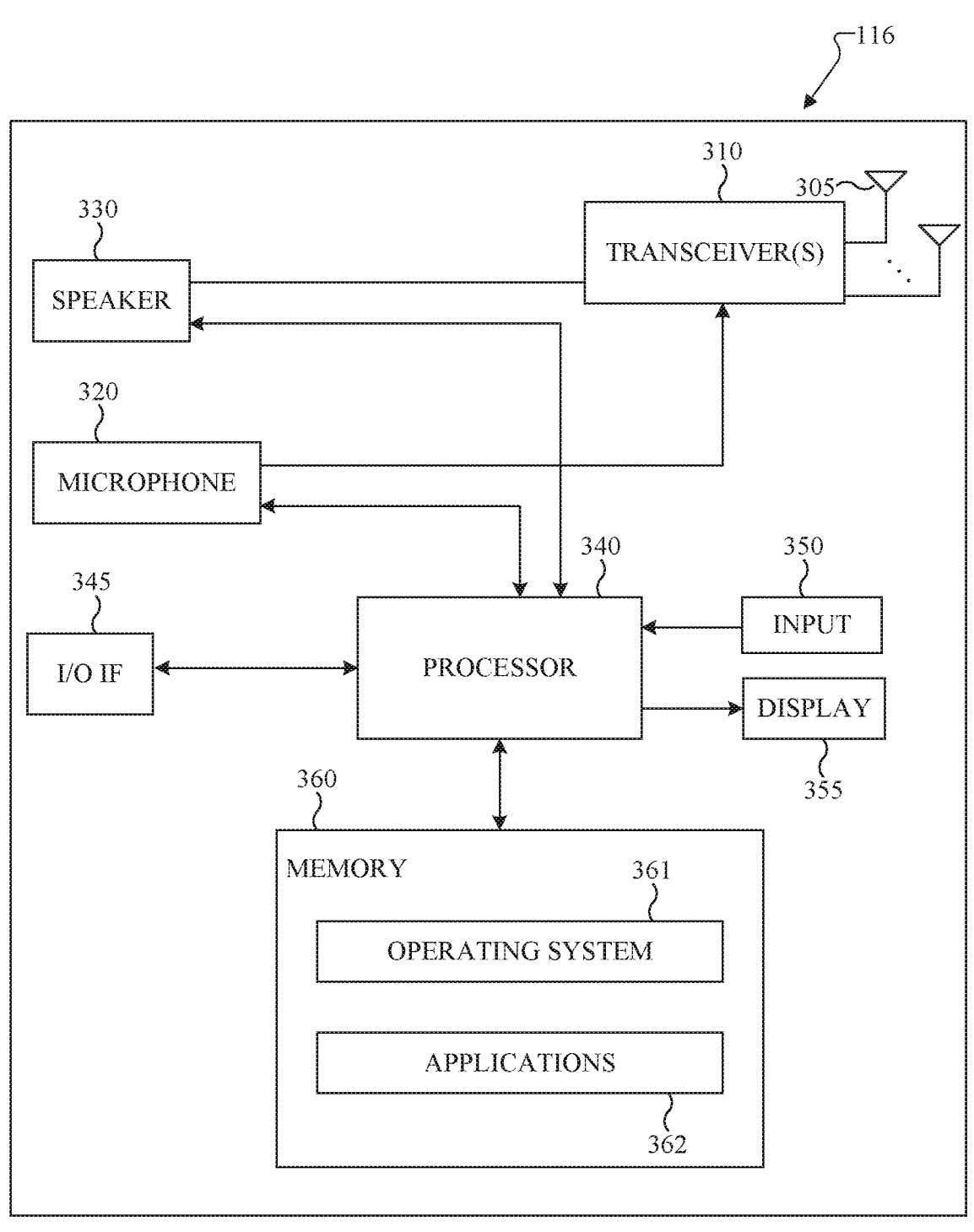
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a DCI size alignment for a scheduled cell with multiple scheduling cells in a wireless communication system. In certain embodiments, and one or more of the gNBs 101-103 includes circuitry, programing, or a combination thereof, for a DCI size alignment for a scheduled cell with multiple scheduling cells in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for a DCI size alignment for a scheduled cell with multiple scheduling cells in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a DCI size alignment for a scheduled cell with multiple scheduling cells in a wireless communication system.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355m which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
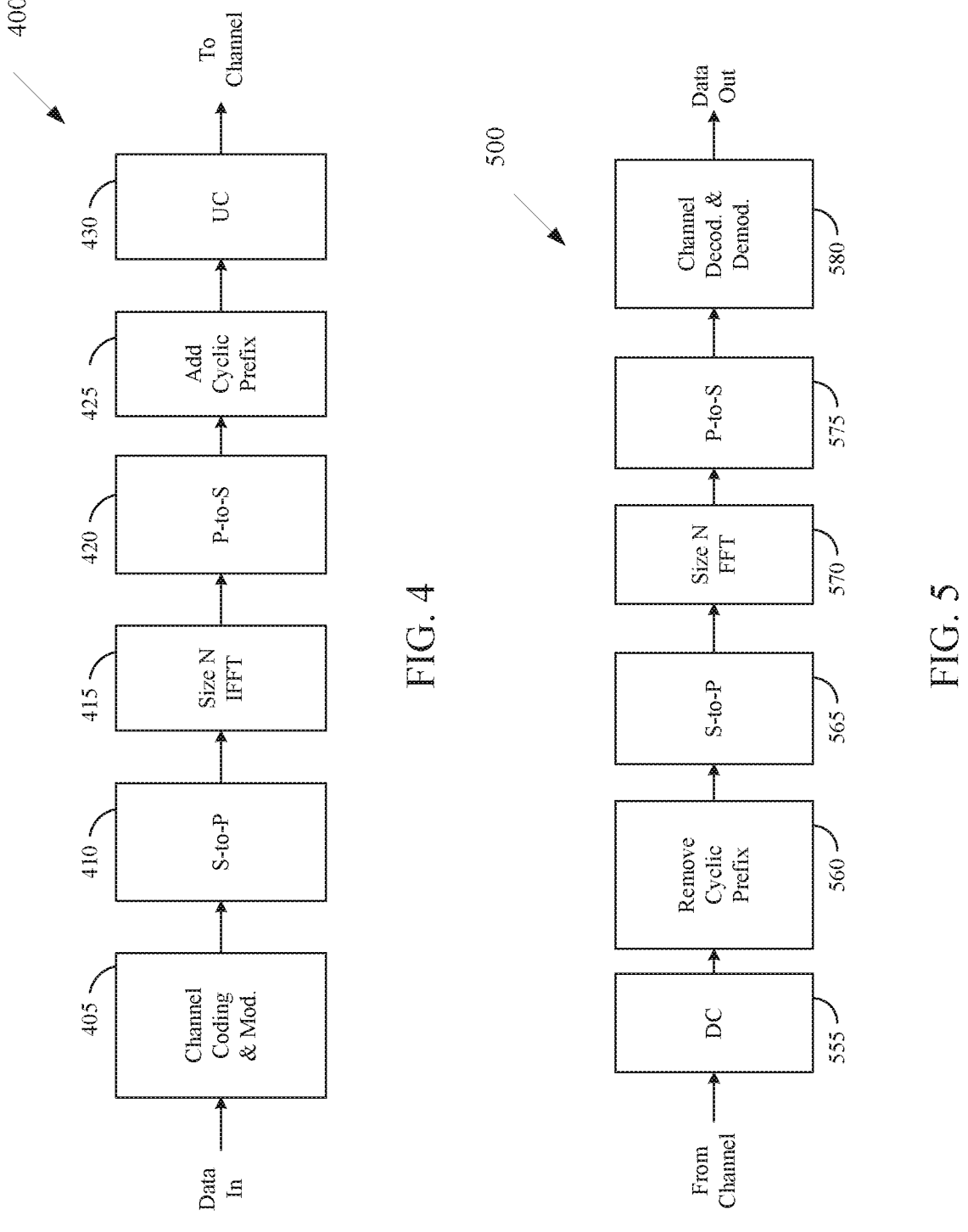
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support a DCI size alignment for a scheduled cell with multiple scheduling cells in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a downconverter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 downconverts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure considers a scheduled cell, such as the primary cell (PCell), with multiple scheduling cells, such as the PCell and a secondary cell (SCell) for a UE. For a same DCI format that can be used for scheduling the UE on the scheduled cell from the multiple scheduling cells, a size of the DCI format needs to be same on the multiple scheduling cells when, otherwise, a total number of sizes of DCI formats used for scheduling on the scheduled cell may exceed a predetermined maximum number of sizes of DCI formats that can be predetermined in the specifications of the system operation or indicated by the UE as a capability.

Having multiple scheduling cells for a scheduled cell is relevant, for example, for operation with dynamic spectrum sharing (DSS) for the PCell when a network support coexistence of LTE radio access technology (RAT) and NR RAT on the PCell. For brevity of descriptions, the present disclosure considers the PCell as the scheduled cell and the PCell and an SCell as the scheduling cells. The embodiments of the disclosure apply for any cell as a scheduled cell and for any number of cells and for any cells as scheduling cells. The scheduling SCell may also be referred to as special secondary cell or sSCell.

When the PCell is a scheduled cell that has two scheduling cells for a UE, since scheduling applies to a same scheduled cell (the PCell), the UE expects a same size for a DCI format that is used for scheduling on the PCell from the two different scheduling cells (PCell and SCell). For example, a size of a DCI format 0_1 for scheduling on the PCell may be same regardless of whether the DCI format 0_1 is provided by a first PDCCH reception on the PCell or by a second PDCCH reception on the SCell.

As described in TS 38.213 for NR operation, a UE expects to monitor PDCCH candidates for up to 4 sizes of DCI formats that include up to 3 sizes of DCI formats with CRC scrambled by C-RNTI per serving/scheduled cell. The UE counts a number of sizes for DCI formats per serving cell based on a number of configured PDCCH candidates in respective search space sets for the corresponding active DL BWP. For brevity, the above requirement may be referred to as the "3+1" DCI size budget or the "3+1" rule. When applicable, the UE performs zero-padding for one or multiple DCI formats, as described in 38.212, in order to fulfil the "3+1" DCI size budget.

A first issue is to determine a procedure for a UE to fulfill both of (i) a DCI size budget such as the "3+1" rule for the PCell as a scheduled cell, and (ii) size alignment for a DCI format between PCell and SCell when the DCI format is used for scheduling on the PCell from the PCell and the SCell. For example, the UE aligns to a first size both a size of a DCI format 1_2 for PDCCH receptions on PCell and a size of DCI format 1_2 for PDCCH receptions on SCell for scheduling on the PCell. Similar, the UE aligns to a second size both a size of a DCI format 0_2 for PDCCH receptions on PCell and a size of DCI format 0_2 for PDCCH receptions on SCell for scheduling on the PCell. If the first size is different from the second size (for example, first size is larger than the second size), and the "3+1" DCI size budget is exceeded, the UE needs to align the sizes of DCI format 0_2 and DCI format 1_2 for scheduling on the PCell (for example, zero pad DCI format 0_2 to achieve a same size as DCI format 1_2), in order to fulfil the "3+1" DCI size budget.

Such operation is referred in the present disclosure as cross-cell DCI size alignment. Therefore, cross-cell DCI size alignment for a DCI format with corresponding PDCCHs monitored by a UE on both PCell and SCell for scheduling on PCell needs to be determined. For example, the UE needs to apply such DCI size alignment to the DCI format on both the PCell and the SCell.

A second issue is for cross-cell DCI size alignment between PCell and SCell for scheduling on the PCell by a UE when the SCell is a deactivated SCell for the UE or the UE has an active DL BWP on the SCell that is a dormant BWP. In such case, the UE does not have an active DL BWP (in case of SCell deactivation) or an active DL BWP is not used for PDCCH monitoring (in case of an active dormant BWP on the SCell. Therefore, the UE needs to determine a DL BWP of the SCell to use for DCI size determination or cross-cell DCI size alignment between PCell and SCell for scheduling on the PCell.

Therefore, there is a need for a UE to simultaneously fulfill both of (i) a DCI size budget such as the "3+1" rule for the PCell as a scheduled cell, and (ii) cross-cell DCI size alignment between PCell and SCell for scheduling on the PCell.

There is another need for a UE to determine reference DL BWPs for DCI size determination or cross-cell DCI size alignment between PCell and SCell for scheduling on the PCell when the SCell is a deactivated SCell for the UE or an active DL BWP on the SCell for the UE is a dormant BWP.

When a UE is configured with scheduling on the primary cell from the primary cell and from a secondary cell, the UE can perform an initial cross-cell DCI size alignment (between PCell and SCell) prior to zero-padding for the "3+1" DCI size budget. In such a case, the UE determines a same size for same DCI formats on the PCell and the SCell. However, if fulfillment of the DCI size budget "3+1" for the PCell (as a scheduled cell) requires an additional DCI size alignment that results in a change for the size of a DCI format for scheduling on the PCell, such additional DCI size alignment needs to be applied to the DCI format on both the PCell and the SCell. Such operation with two stages of cross-cell DCI size alignment between PCell and SCell for scheduling on the PCell may be necessary also when the UE performs the zero-padding to fulfill the "3+1" DCI size budget prior to cross-cell DCI size alignment as described in TS 38.212. Therefore, the order of operations is not material.

When a UE is configured with scheduling on the primary cell from the PCell and from a SCell, and the SCell is deactivated for the UE, the UE determines a size of a DCI format for scheduling on the PCell from the SCell based on a first reference BWP of the SCell, such as a BWP provided by firstActiveDownlinkBWP. When an active DL BWP for the UE on the SCell is a dormant BWP, the UE can determine a size of a DCI format for scheduling on the PCell from the SCell based on a second reference BWP of the SCell, such as a BWP provided by firstOutsideActiveTime-BWP or firstWithinActiveTimeBWP. In one instance, the first reference BWP can be same as the second reference BWP, for example, the UE can use a BWP on the SCell provided by firstActiveDownlinkBWP for both when the SCell is deactivated for the UE and when the UE has an active dormant BWP on the SCell. In another instance, the UE requires the first reference BWP, while the second reference BWP is not needed and the UE determines a DCI format size for scheduling from the SCell on the PCell based on the dormant BWP.

In one embodiment, cross-cell DCI size alignment in presence of "3+1" rule is provided.

In one embodiment, for a UE configured with scheduling from an SCell on a PCell (in addition to self-scheduling on the PCell), for simultaneous fulfillment of: (1) the "3+1" DCI size budget for the PCell, and (2) size alignment for a same DCI format, such as DCI format 0_1/1_1/0_2/1_2, for scheduling on the PCell being provided by PDCCH receptions on the PCell or the SCell, the UE first size matches DCI formats (associated with UE-specific search space (USS) sets) on the two scheduling cells (PCell and SCell) for scheduling on the PCell, and then, when needed in order to achieve the "3+1" DCI size budget for the PCell, a same zero-padding applies to a same DCI format, such as DCI format 0_1 or DCI format 1_1, on the PCell and the SCell for scheduling on the PCell in order to align corresponding sizes of the DCI format on the PCell and the SCell for scheduling on the PCell with another DCI format on the PCell and the SCell for scheduling on the PCell.

In one embodiment, for a UE configured with scheduling from an SCell on the PCell and the SCell is deactivated for the UE or the UE has a dormant active DL BWP on the SCell, the UE determines a size alignment procedure for DCI formats scheduling on the PCell based on a reference DL BWP on the SCell. The reference BWP on the SCell can be a first active DL BWP, or a first outside-active-time BWP or a first within-active-time BWP, or an initial DL BWP, or a default BWP, and so on. The reference BWP can be same or different for the case of SCell deactivation for the UE compared to the case that an active DL BWP on the SCell is a dormant DL BWP for the UE.

When a UE is configured with scheduling on the primary cell from the primary cell and from a secondary cell, the UE can perform an initial cross-cell DCI size alignment (between PCell and SCell) prior to zero-padding for the "3+1" DCI size budget. In such a case, the UE determines a same size for same DCI formats on the PCell and the SCell. However, if fulfillment of the DCI size budget "3+1" for the PCell (as a scheduled cell) requires an additional DCI size alignment that results in a change for the size of a DCI format for scheduling on the PCell, such additional DCI size alignment needs to be applied to the DCI format on both the PCell and the SCell. Such operation with two stages of cross-cell DCI size alignment between PCell and SCell for scheduling on the PCell may be necessary also when the UE performs the zero-padding to fulfill the "3+1" DCI size budget prior to cross-cell DCI size alignment as described in TS 38.212. Therefore, the order of operations is not material.

When a UE is configured with scheduling on the primary cell from the PCell and from a SCell, and the SCell is deactivated for the UE, the UE determines a size of a DCI format for scheduling on the PCell from the SCell based on a first reference BWP of the SCell, such as a BWP provided by firstActiveDownlinkBWP. When an active DL BWP for the UE on the SCell is a dormant BWP, the UE can determine a size of a DCI format for scheduling on the PCell from the SCell based on a second reference BWP of the SCell, such as a BWP provided by firstOutsideActiveTime-BWP or firstWithinActiveTimeBWP.

In one instance, the first reference BWP can be same as the second reference BWP, for example, the UE can use a BWP on the SCell provided by firstActiveDownlinkBWP for both when the SCell is deactivated for the UE and when the UE has an active dormant BWP on the SCell. In another instance, the UE requires the first reference BWP, while the second reference BWP is not needed and the UE determines a DCI format size for scheduling from the SCell on the PCell based on the dormant BWP.

In one embodiment, cross-cell DCI size alignment in presence of "3+1" rule is provided.

In one embodiment, for a UE configured with scheduling from an SCell on a PCell (in addition to self-scheduling on the PCell), for simultaneous fulfillment of: (1) the "3+1" DCI size budget for the PCell, and (2) size alignment for a same DCI format, such as DCI format 0_1/1_1/0_2/1_2, for scheduling on the PCell being provided by PDCCH receptions on the PCell or the SCell, the UE first size matches DCI formats (associated with USS sets) on the two scheduling cells (PCell and SCell) for scheduling on the PCell, and then, when needed in order to achieve the "3+1" DCI size budget for the PCell, a same zero-padding applies to a same DCI format, such as DCI format 0_1 or DCI format 1_1, on the PCell and the SCell for scheduling on the PCell in order to align corresponding sizes of the DCI format on the PCell and the SCell for scheduling on the PCell with another DCI format on the PCell and the SCell for scheduling on the PCell.

In one embodiment, for a UE configured with scheduling from an SCell on the PCell and the SCell is deactivated for the UE or the UE has a dormant active DL BWP on the SCell, the UE determines a size alignment procedure for DCI formats scheduling on the PCell based on a reference DL BWP on the SCell. The reference BWP on the SCell can be a first active DL BWP, or a first outside-active-time BWP or a first within-active-time BWP, or an initial DL BWP, or a default BWP, and so on. The reference BWP can be same or different for the case of SCell deactivation for the UE compared to the case that an active DL BWP on the SCell is a dormant DL BWP for the UE.

Throughout the present disclosure, the term "configuration" or "higher layer configuration" and variations thereof (such as "configured" and so on) are used to refer to one or more of: a system information signaling such as by a MIB or a SIB (such as SIB1), a common or cell-specific higher layer/RRC signaling, or a dedicated or UE-specific or BWP-specific higher layer/RRC signaling.

In carrier aggregation (CA), two or more component carriers (CCs), corresponding to respective two or more serving cells, are aggregated. A UE may simultaneously receive or transmit on one or multiple cells depending on its capabilities: (1) a UE with single timing advance capability for CA can simultaneously receive and/or transmit on multiple CCs corresponding to multiple serving cells sharing the same timing advance (multiple serving cells grouped in one TAG); (2) a UE with multiple timing advance capability for CA can simultaneously receive and/or transmit on multiple CCs corresponding to multiple serving cells with different timing advances (multiple serving cells grouped in multiple TAGs). NG-RAN ensures that each TAG contains at least one serving cell; and (3) a non-CA capable UE can receive on a single CC and transmit on a single CC corresponding to one serving cell only (one serving cell in one TAG).

CA is supported for both contiguous and non-contiguous CCs in frequency. When CA is deployed frame timing and SFN are aligned across cells that can be aggregated, or an offset in multiples of slots between the PCell/PSCell and an SCell is configured to the UE. A maximum number of configured CCs for a UE is, for example, 16 for DL and 16 for UL.

When CA is configured to a UE, the UE only has one RRC connection with the network. At RRC connection establishment/re-establishment/handover, one serving cell provides the NAS mobility information, and at RRC connection re-establishment/handover, one serving cell provides the security input. This cell is referred to as the PCell. Depending on UE capabilities, SCells can be configured to form together with the PCell a set of serving cells. The configured set of serving cells for a UE therefore includes one PCell and one or more SCells.

The reconfiguration, addition and removal of SCells can be performed by RRC. At intra-NR handover and during connection resume from RRC_INACTIVE, the network can also add, remove, keep, or reconfigure SCells for usage with the target PCell. When adding a new SCell, dedicated RRC signalling is used for sending all required system information of the SCell i.e., while in connected mode, UEs need not acquire broadcast system information directly from the SCells.

To enable reduced UE battery consumption when CA is configured, an activation/deactivation mechanism of cells is supported. When an SCell is deactivated, the UE does not need to receive the corresponding PDCCH or PDSCH, cannot transmit in the corresponding uplink, nor is it required to perform CQI measurements. Conversely, when an SCell is active, the UE may receive PDSCH and PDCCH (if the UE is configured to monitor PDCCH from this SCell) and is expected to be able to perform CQI measurements. NG-RAN ensures that while PUCCH SCell (a secondary cell configured with PUCCH) is deactivated, SCells of secondary PUCCH group (a group of SCells whose PUCCH signalling is associated with the PUCCH on the PUCCH SCell) may not be activated. NG-RAN ensures that SCells mapped to PUCCH SCell are deactivated before the PUCCH SCell is changed or removed.

When reconfiguring the set of serving cells: (1) SCells added to the set are initially activated or deactivated; and (2) SCells which remain in the set (either unchanged or reconfigured) do not change their activation status (activated or deactivated).

At handover or connection resume from RRC_INACTIVE: (1) SCells are activated or deactivated.

To enable reduced UE battery consumption when CA is configured and enable reduced UE complexity, only one UL BWP for each uplink carrier and one DL BWP or only one DL/UL BWP pair can be active at a time in an active serving cell, all other BWPs that the UE is configured with being deactivated. On deactivated BWPs, the UE does not monitor the PDCCH, does not transmit on PUCCH, PRACH and UL-SCH.

To enable fast SCell activation when CA is configured, one dormant BWP can be configured for an SCell. If the active BWP of the activated SCell is a dormant BWP, the UE stops monitoring PDCCH and transmitting SRS/PUSCH/PUCCH on the SCell but continues performing CSI measurements, AGC and beam management, if configured. A DCI is used to control entering/leaving the dormant BWP for one or more SCells or one or more SCell groups.

The dormant BWP is one of the UE's dedicated BWPs configured by network via dedicated RRC signalling. The SpCell and PUCCH SCell cannot be configured with a dormant BWP.

If the MAC entity is configured with one or more SCells, the network may activate and deactivate the configured SCells. Upon configuration of an SCell, the SCell is deactivated unless the parameter sCellState is set to activated for the SCell by upper layers.

The configured SCell(s) is activated and deactivated by:
receiving the SCell Activation/Deactivation MAC CE described in clause 6.1.3.10;
receiving the Enhanced SCell Activation/Deactivation MAC CE described in clause 6.1.3.55;
configuring sCellDeactivation Timer timer per configured SCell (except the SCell configured with PUCCH, if any): the associated SCell is deactivated upon its expiry;
configuring sCellState per configured SCell: if configured, the associated SCell is activated upon SCell configuration.

The MAC entity shall for each configured SCell:
1> if an SCell is configured with sCellState set to activated upon SCell configuration, or an SCell Activation/Deactivation MAC CE or an Enhanced SCell Activation/Deactivation MAC CE is received activating the SCell:
  2> if the SCell was deactivated prior to receiving this Enhanced SCell Activation/Deactivation MAC CE and a TRS is selected for SCell activation:
    3> indicate to lower layers the information regarding the TRS.
  2> if the SCell was deactivated prior to receiving this SCell Activation/Deactivation MAC CE or this Enhanced SCell Activation/Deactivation MAC CE; or
  2> if the SCell is configured with sCellState set to activated upon SCell configuration:
    3> if firstActiveDownlinkBWP-Id is not set to dormant BWP:
      4> activate the SCell according to the timing defined in 3GPP TS 38.213 v17.2.0 for MAC CE activation and according to the timing defined in 3GPP TS 38.133 v17.2.0 for direct SCell activation; i.e. apply normal SCell operation including:
        5> SRS transmissions on the SCell;
        5> CSI reporting for the SCell;
        5> PDCCH monitoring on the SCell;
        5> PDCCH monitoring for the SCell;
        5> PUCCH transmissions on the SCell, if configured.
    3> else (i.e.firstActiveDownlinkBWP-Id is set to dormant BWP):
      4> stop the bwp-InactivityTimer of this serving cell, if running;
    3> activate the DL BWP and UL BWP indicated by firstActiveDownlinkBWP-Id and firstActiveUplinkBWP-Id respectively.

2> start or restart the sCellDeactivationTimer associated with the SCell according to the timing defined in 3GPP TS 38.213 v17.2.0 for MAC CE activation and according to the timing defined in 3GPP TS 38.133 v17.2.0 for direct SCell activation;
  2> if the active DL BWP is not the dormant BWP:
    3> (re-)initialize any suspended configured uplink grants of configured grant Type 1 associated with this SCell according to the stored configuration, if any, and to start in the symbol according to rules in clause 5.8.2;
    3> trigger PHR according to clause 5.4.6.
1> else if an SCell Activation/Deactivation MAC CE or an Enhanced SCell Activation/Deactivation MAC CE is received deactivating the SCell; or
1> if the sCellDeactivationTimer associated with the activated SCell expires:
  2> deactivate the SCell according to the timing defined in 3GPP TS 38.213 v17.2.0;
  2> stop the sCellDeactivationTimer associated with the SCell;
  2> stop the bwp-InactivityTimer associated with the SCell;
  2> deactivate any active BWP associated with the SCell;
  2> clear any configured downlink assignment and any configured uplink grant Type 2 associated with the SCell respectively;
  2> clear any PUSCH resource for semi-persistent CSI reporting associated with the SCell;
  2> suspend any configured uplink grant Type 1 associated with the SCell;
  2> flush all HARQ buffers associated with the SCell;
  2> cancel, if any, triggered consistent LBT failure for the SCell.
1> if PDCCH on the activated SCell indicates an uplink grant or downlink assignment; or
1> if PDCCH on the serving cell scheduling the activated SCell indicates an uplink grant or a downlink assignment for the activated SCell; or
1> if a MAC PDU is transmitted in a configured uplink grant and LBT failure indication is not received from lower layers; or
1> if a MAC PDU is received in a configured downlink assignment:
  2> restart the sCellDeactivationTimer associated with the SCell.
1> if the SCell is deactivated:
  2> not transmit SRS on the SCell;
  2> not report CSI for the SCell;
  2> not transmit on UL-SCH on the SCell;
  2> not transmit on RACH on the SCell;
  2> not monitor the PDCCH on the SCell;
  2> not monitor the PDCCH for the SCell;
  2> not transmit PUCCH on the SCell.

HARQ feedback for the MAC PDU containing SCell Activation/Deactivation MAC CE or Enhanced SCell Activation/Deactivation MAC CE shall not be impacted by PCell, PSCell and PUCCH SCell interruptions due to SCell activation/deactivation in 3GPP TS 38.133 v17.2.0.

When a SCell is deactivated, the ongoing Random Access procedure on the SCell, if any, is aborted.

A serving cell may be configured with one or multiple BWPs, and the maximum number of BWP per serving cell is specified in 3GPP TS 38.213 v17.2.0.

The BWP switching for a serving cell is used to activate an inactive BWP and deactivate an active BWP at a time.

The BWP switching is controlled by the PDCCH indicating a downlink assignment or an uplink grant, by the bwp-InactivityTimer, by RRC signalling, or by the MAC entity itself upon initiation of Random Access procedure or upon detection of consistent LBT failure on SpCell. Upon RRC (re-)configuration of firstActiveDownlinkBWP-Id and/or firstActiveUplinkBWP-Id for SpCell except for deactivated SCG or activation of an SCell, the DL BWP and/or UL BWP indicated by firstActiveDownlinkBWP-Id and/or firstActiveUplinkBWP-Id respectively (as specified in 3GPP TS 38.331 v17.1.0) is active without receiving PDCCH indicating a downlink assignment or an uplink grant. Upon RRC (re-)configuration of firstActiveDownlinkBWP-Id for deactivated PSCell, the DL BWP is switched to the firstActiveDownlinkBWP-Id if beam failure detection is configured for the deactivated SCG. The active BWP for a serving cell is indicated by either RRC or PDCCH (as specified in 3GPP TS 38.213 v17.2.0). For unpaired spectrum, a DL BWP is paired with a UL BWP, and BWP switching is common for both UL and DL.

For each SCell a dormant BWP may be configured with dormantBWP-Id by RRC signaling as described in 3GPP TS 38.331 v17.1.0. Entering or leaving dormant BWP for SCells is done by BWP switching per SCell or per dormancy SCell group based on instruction from PDCCH (as specified in 3GPP TS 38.213 v17.2.0). The dormancy SCell group configurations are configured by RRC signaling as described in 3GPP TS 38.331 v17.1.0. Upon reception of the PDCCH indicating leaving dormant BWP, the DL BWP indicated by firstOutsideActiveTimeBWP-Id or by firstWithinActiveTimeBWP-Id (as specified in TS 38.331 v17.1.0 and TS 38.213 v17.2.0) is activated. Upon reception of the PDCCH indicating entering dormant BWP, the DL BWP indicated by dormantBWP-Id (as specified in TS 38.331 v17.1.0) is activated. The dormant BWP configuration for SpCell or PUCCH SCell is not supported.

For each activated serving cell configured with a BWP, the MAC entity shall:

1> if a BWP is activated and the active DL BWP for the serving cell is not the dormant BWP:
  2> transmit on UL-SCH on the BWP;
  2> transmit on RACH on the BWP, if PRACH occasions are configured;
  2> monitor the PDCCH on the BWP;
  2> transmit PUCCH on the BWP, if configured;
  2> report CSI for the BWP;
  2> transmit SRS on the BWP, if configured;
  2> receive DL-SCH on the BWP;
  2> (re-)initialize any suspended configured uplink grants of configured grant Type 1 on the active BWP according to the stored configuration, if any, and to start in the symbol according to rules in clause 5.8.2 of 3GPP TS 38.321 v17.1.0;
  2> if lbt-FailureRecoveryConfig is configured:
    3> stop the lbt-FailureDetectionTimer, if running;
    3> set LBT_COUNTER to 0;
    3> monitor LBT failure indications from lower layers as specified in clause 5.21.2 of 3GPP TS 38.321 v17.1.0.
1> if a BWP is activated and the active DL BWP for the serving cell is dormant BWP:
  2> stop the bwp-InactivityTimer of this serving cell, if running.
  2> not monitor the PDCCH on the BWP;
  2> not monitor the PDCCH for the BWP;
  2> not receive DL-SCH on the BWP;

2> not report CSI on the BWP, report CSI except aperiodic CSI for the BWP;
  2> not transmit SRS on the BWP;
  2> not transmit on UL-SCH on the BWP;
  2> not transmit on RACH on the BWP;
  2> not transmit PUCCH on the BWP;
  2> clear any configured downlink assignment and any configured uplink grant Type 2 associated with the SCell respectively;
  2> suspend any configured uplink grant Type 1 associated with the SCell;
  2> if configured, perform beam failure detection and beam failure recovery for the SCell if beam failure is detected.
1> if a BWP is deactivated:
  2> not transmit on UL-SCH on the BWP;
  2> not transmit on RACH on the BWP;
  2> not monitor the PDCCH on the BWP;
  2> not transmit PUCCH on the BWP;
  2> not report CSI for the BWP;
  2> not transmit SRS on the BWP;
  2> not receive DL-SCH on the BWP;
  2> clear any configured downlink assignment and configured uplink grant of configured grant Type 2 on the BWP;
  2> suspend any configured uplink grant of configured grant Type 1 on the inactive BWP.

Upon initiation of the Random Access procedure on a serving cell, after the selection of carrier for performing Random Access procedure as specified in clause 5.1.1 of 3GPP TS 38.321 v17.1.0, the MAC entity shall for the selected carrier of this serving cell:

1> if PRACH occasions are not configured for the active UL BWP:
  2> if UE is a RedCap UE; and
  2> if initialUplinkBWP-RedCap is configured:
    3> switch the active UL BWP to BWP configured by initialUplinkBWP-RedCap.
  2> else:
    3> switch the active UL BWP to BWP indicated by initialUplinkBWP.
  2> if the serving cell is an SpCell:
    3> if the UE is a RedCap UE; and
    3> if initialDownlinkBWP-RedCap is configured:
      4> switch the active DL BWP to BWP configured by initialDownlinkBWP-RedCap.
    3> else:
      4> switch the active DL BWP to BWP indicated by initialDownlinkBWP.
1> else:
  2> if the serving cell is an SpCell:
    3> if the active DL BWP does not have the same bwp-Id as the active UL BWP:
      4> switch the active DL BWP to the DL BWP with the same bwp-Id as the active UL BWP.
1> stop the bwp-InactivityTimer associated with the active DL BWP of this serving cell, if running.
1> if the serving cell is SCell:
  2> stop the bwp-InactivityTimer associated with the active DL BWP of SpCell, if running.
1> perform the Random Access procedure on the active DL BWP of SpCell and active UL BWP of this serving cell.

If the MAC entity receives a PDCCH for BWP switching of a serving cell, the MAC entity shall:

1> if there is no ongoing Random Access procedure associated with this serving cell; or 1> if the ongoing Random Access procedure associated with this serving cell is successfully completed upon reception of this PDCCH addressed to C-RNTI (as specified in clauses 5.1.4, 5.1.4a, and 5.1.5 of 3GPP TS 38.321 v17.1.0):

2> cancel, if any, triggered consistent LBT failure for this serving cell;

2> perform BWP switching to a BWP indicated by the PDCCH.

If the MAC entity receives a PDCCH for BWP switching for a serving cell or a dormancy SCell group while a Random Access procedure associated with that serving cell is ongoing in the MAC entity, it is up to UE implementation whether to switch BWP or ignore the PDCCH for BWP switching, except for the PDCCH reception for BWP switching addressed to the C-RNTI for successful Random Access procedure completion (as specified in clauses 5.1.4, 5.1.4a, and 5.1.5 of 3GPP TS 38.321 v17.1.0) in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure after performing the BWP switching; if the MAC decides to ignore the PDCCH for BWP switching, the MAC entity shall continue with the ongoing Random Access procedure on the serving cell.

Upon reception of RRC (re-)configuration for BWP switching for a serving cell while a Random Access procedure associated with that serving cell is ongoing in the MAC entity, the MAC entity shall stop the ongoing Random Access procedure and initiate a Random Access procedure after performing the BWP switching.

Upon reception of RRC (re-)configuration for BWP switching for a serving cell, cancel any triggered LBT failure in this serving cell.

The MAC entity shall for each activated serving cell configured with bwp-InactivityTimer:

1> if the defaultDownlinkBWP-Id is configured, and the active DL BWP is not the BWP indicated by the defaultDownlinkBWP-Id, and the active DL BWP is not the BWP indicated by the dormantBWP-Id if configured; or 1> if the defaultDownlinkBWP-Id is not configured, and the active DL BWP is not the initialDownlinkBWP, and the active DL BWP is not the BWP indicated by the dormantBWP-Id if configured:

2> if a PDCCH addressed to C-RNTI or CS-RNTI indicating downlink assignment or uplink grant is received on the active BWP; or 2> if a PDCCH addressed to G-RNTI or G-CS-RNTI configured for multicast indicating downlink assignment is received on the active BWP; or 2> if a PDCCH addressed to C-RNTI or CS-RNTI indicating downlink assignment or uplink grant is received for the active BWP; or 2> if a MAC PDU is transmitted in a configured uplink grant and LBT failure indication is not received from lower layers; or 2> if a MAC PDU is received in a configured downlink assignment for unicast or MBS multicast:

3> if there is no ongoing Random Access procedure associated with this serving cell; or 3> if the ongoing Random Access procedure associated with this serving cell is successfully completed upon reception of this PDCCH addressed to C-RNTI (as specified in clauses 5.1.4, 5.1.4a and 5.1.5 of 3GPP TS 38.321 v17.1.0):

4> start or restart the bwp-InactivityTimer associated with the active DL BWP.

2> if the bwp-Inactivity Timer associated with the active DL BWP expires:

3> if the defaultDownlinkBWP-Id is configured:

4> perform BWP switching to a BWP indicated by the defaultDownlinkBWP-Id.

3> else:

4> perform BWP switching to the initialDownlinkBWP.

NOTE: If a Random Access procedure is initiated on an SCell, both this SCell and the SpCell are associated with this Random Access procedure.

1> if a PDCCH for BWP switching is received, and the MAC entity switches the active DL BWP:

2> if the defaultDownlinkBWP-Id is configured, and the MAC entity switches to the DL BWP which is not indicated by the defaultDownlinkBWP-Id and is not indicated by the dormantBWP-Id if configured; or 2> if the defaultDownlinkBWP-Id is not configured, and the MAC entity switches to the DL BWP which is not the initialDownlinkBWP and is not indicated by the dormantBWP-Id if configured:

3> start or restart the bwp-InactivityTimer associated with the active DL BWP.

The MAC entity may be configured by RRC with a Discontinuous Reception (DRX) functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI and SL Semi-Persistent Scheduling V-RNTI. When using DRX operation, the MAC entity shall also monitor PDCCH according to requirements found in other clauses of this specification. When in RRC_CONNECTED, if DRX is configured, for all the activated serving cells, the MAC entity may monitor the PDCCH discontinuously using the DRX operation specified in this clause; otherwise the MAC entity shall monitor the PDCCH as specified in 3GPP TS 38.213 v17.2.0.

RRC controls DRX operation by configuring the following parameters:

drx-onDurationTimer: the duration at the beginning of a DRX cycle;

drx-SlotOffset: the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX cycle starts;

drx-ShortCycle (optional): the Short DRX cycle;

drx-ShortCycle Timer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity;

drx-RetransmissionTimerSL (per SL HARQ process): the maximum duration until a grant for SL retransmission is received;

drx-HARQ-RTT-TimerSL (per SL HARQ process): the minimum duration before an SL retransmission grant is expected by the MAC entity;

ps-Wakeup (optional): the configuration to start associated drx-onDurationTimer in case DCP is monitored but not detected;

ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;

ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started;

uplinkHARQ-Mode (optional): the configuration to set the HARQ mode per UL HARQ process.

Serving cells of a MAC entity may be configured by RRC in two DRX groups with separate DRX parameters. When RRC does not configure a secondary DRX group, there is only one DRX group and all serving cells belong to that one DRX group. When two DRX groups are configured, each serving cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, drx-HARQ-RTT-TimerUL, and uplinkHARQ-Mode (optional).

When DRX is configured, the Active Time for serving cells in a DRX group includes the time while:

drx-onDurationTimer or drx-InactivityTimer configured for the DRX group is running; or drx-RetransmissionTimerDL, drx-RetransmissionTimerUL or drx-RetransmissionTimerSL is running on any serving cell in the DRX group; or ra-ContentionResolutionTimer (as described in clause 5.1.5 of 3GPP TS 38.321 v17.1.0) or msgB-Response-Window (as described in clause 5.1.4a of 3GPP TS 38.321 v17.1.0) is running; or a Scheduling Request is sent on PUCCH and is pending (as described in clause 5.4.4 or 5.22.15 of 3GPP TS 38.321 v17.1.0). If this serving cell is part of a non-terrestrial network, the Active Time is started after the first Scheduling Request transmission plus the UE-gNB RTT; or a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a of 3GPP TS 38.321 v17.1.0).

Cross-carrier scheduling using a carrier indicator field (CIF) allows a DCI format provided by a PDCCH on a serving/scheduling cell to schedule resources on another serving/scheduled cell with the following restrictions of example.

In one example, when cross-carrier scheduling from an SCell to PCell is not configured to a UE, the UE can be scheduled transmission or reception on the PCell only by a DCI format provided by a PDCCH reception on the PCell.

In one example, when cross-carrier scheduling from an SCell to PCell is configured to a UE: (1) PDCCH on that SCell can provide a DCI format that schedules a PDSCH PDSCH reception or a PUSCH transmission from the UE on the PCell; (2) PDCCH on the PCell can provide a DCI format that schedules a PDSCH reception or a PUSCH transmission from the UE on the PCell; and (3) only one SCell can be configured to the UE for cross-carrier scheduling on the PCell.

In one example, when an SCell is configured to a UE as a scheduling cell, a PDSCH reception or a PUSCH transmission from the UE is scheduled by a DCI format provided by a PDCCH reception on the SCell.

In one example, when an SCell is not configured to a UE as a scheduling cell, a PDSCH reception or a PUSCH transmission from the UE is scheduled by a DCI format provided by a PDCCH reception on another serving cell.

In one example, a PDCCH reception on a scheduling cell can have same or different numerology than an associated PDSCH reception or PUSCH transmission on a scheduled cell.

The physical downlink control channel (PDCCH) can be used to schedule DL transmissions on PDSCH and UL transmissions on PUSCH, where the downlink control information (DCI) on PDCCH includes: (1) downlink assignments containing at least modulation and coding format, resource allocation, and hybrid-ARQ information related to DL-SCH; and (2) uplink scheduling grants containing at least modulation and coding format, resource allocation, and hybrid-ARQ information related to UL-SCH.

In addition to scheduling, PDCCH can be used to for: (1) activation and deactivation of configured PUSCH transmission with configured grant; (2) activation and deactivation of PDSCH semi-persistent transmission; (3) notifying one or more UEs of the slot format; (4) notifying one or more UEs of the PRB(s) and OFDM symbol(s) where the UE may assume no transmission is intended for the UE; (5) transmission of TPC commands for PUCCH and PUSCH; (6) transmission of one or more TPC commands for SRS transmissions by one or more UEs; (7) switching a UE's active bandwidth part; (8) initiating a random access procedure; (9) indicating one or more UEs to monitor the PDCCH during the next occurrence of the DRX on-duration; (10) in IAB context, indicating the availability for soft symbols of an IAB-DU; (11) triggering one shot HARQ-ACK codebook feedback; and (12) for operation with shared spectrum channel access: (i) triggering search space set group switching; (ii) indicating one or more UEs about the available RB sets and channel occupancy time duration; and (iii) indicating downlink feedback information for configured grant PUSCH (CG-DFI).

A UE monitors a set of PDCCH candidates in the configured monitoring occasions in one or more configured control resource sets (CORESETs) according to the corresponding search space sets configurations.

A CORESET consists of a set of PRBs with a time duration of 1 to 3 OFDM symbols. The resource units resource element groups (REGs) and control channel elements (CCEs) are defined within a CORESET with each CCE including a set of REGs. Control channels are formed by aggregation of CCE. Different code rates for the control channels are realized by aggregating different number of CCE. Interleaved and non-interleaved CCE-to-REG mapping are supported in a CORESET.

A polar coding is used for a DCI format in a PDCCH. Each resource element group carrying PDCCH carries its own DM-RS. QPSK modulation is used for coded symbols of a DCI format in a PDCCH.

The UE can be configured self-carrier and cross-carrier scheduling on the primary cell.

A UE can be configured for scheduling on the primary cell from the primary cell or from a secondary cell TS 38.331. The UE is either not provided monitoringCapabilityConfig or the UE is provided only monitoringCapability-Config=r15monitoringcapability for the primary cell and for the secondary cell. The UE is not provided coresetPoolIndex on the primary cell or on the secondary cell.

The SCS configuration $\mu_P$ for the active DL BWP on the primary cell is smaller than or equal to the SCS configuration $\mu_S$ for the active DL BWP on the secondary cell.

If a UE indicates capability as described in TS 38.306 and the secondary cell is deactivated, or if the UE indicates capability as described in TS 38.306, and the active DL BWP of the secondary cell is a dormant DL BWP for the UE, $\alpha=1$ applies for the procedures described in TS 38.306.

If $\mu_P < \mu_S$, the UE determines $M_{PDCCH}^{total,slot,\mu_P}$ and $C_{PDCCH}^{total,slot,\mu_P}$, and determines $M_{PDCCH}^{total,slot,\mu_S}$ and $C_{PDCCH}^{total,slot,\mu_S}$, by including the primary cell only in the $N_{cells,0}^{DL,\mu_P}$ downlink cells in $\Sigma_{j=0}^{3}(N_{cells,0}^{DL,j}+\gamma \cdot N_{cells,1}^{DL,j})$, as described in 3GPP standard specification. If $\mu_P = \mu_S = \mu$, the UE determines $M_{PDCCH}^{total,slot,\mu}$ and $C_{PDCCH}^{total,slot,\mu}$ by including the primary cell once in the $N_{cells,0}^{DL,\mu}$ downlink cells in $\Sigma_{j=0}^{3}(N_{cells,0}^{DL,j}+\gamma \cdot N_{cells,1}^{DL,j})$, as described in 3GPP standard specification.

For scheduling on the primary cell from the primary cell, the UE is not required to monitor more than $\lfloor \alpha \cdot \min(M_{PDCCH}^{max,slot,\mu_P}, M_{PDCCH}^{total,slot,\mu_P}) \rfloor$ PDCCH candidates per slot or more than $\lfloor \alpha \cdot \min(C_{PDCCH}^{max,slot,\mu_P}, C_{PDCCH}^{total,slot,\mu_P}) \rfloor$ non-overlapping CCEs per slot on the active DL BWP of the primary cell, where $\alpha$ is provided by ccs-BlindDetectionSplit.

For scheduling on the primary cell from the secondary cell, the UE is not required to monitor on the active DL BWP of the secondary cell more than: (1) $M_{PDCCH}^{max,slot,\mu_S}$ PDCCH candidates per slot or more than $C_{PDCCH}^{max,slot,\mu_S}$ non-overlapping CCEs per slot of the active DL BWP of the secondary cell; and (2) $\min(M_{PDCCH}^{max,slot,\mu_P}, M_{PDCCH}^{total,slot,\mu_P}) - \lfloor \alpha \cdot \min(M_{PDCCH}^{max,slot,\mu_P}, M_{PDCCH}^{total,slot,\mu_P}) \rfloor$ PDCCH candidates per slot or more than $\min(C_{PDCCH}^{max,slot,\mu_P}, C_{PDCCH}^{total,slot,\mu_P}) - \lfloor \alpha \cdot \min(C_{PDCCH}^{max,slot,\mu_P}, C_{PDCCH}^{total,slot,\mu_P}) \rfloor$ non-overlapping CCEs per slot of the active DL BWP of the primary cell.

If $\mu_P < \mu_S$, the UE does not count PDCCH candidates and non-overlapping CCEs that the UE monitors for scheduling on the primary cell from the secondary cell towards $M_{PDCCH}^{total,slot,\mu_S}$ and $C_{PDCCH}^{total,slot,\mu_S}$, respectively.

If $\mu_P < \mu_S$, the UE counts PDCCH candidates and non-overlapping CCEs that the UE monitors for scheduling on the primary cell from the secondary cell towards $M_{PDCCH}^{total,slot,\mu_P}$ and $C_{PDCCH}^{total,slot,\mu_P}$, respectively.

For allocation of PDCCH candidates and non-overlapping CCEs to search space sets for scheduling on the primary cell from the primary cell, the UE applies the procedure in 3GPP standard specification using $\lfloor \alpha \cdot \min(M_{PDCCH}^{max,slot,\mu}, M_{PDCCH}^{total,slot,\mu}) \rfloor$ instead of $\min(M_{PDCCH}^{max,slot,\mu}, M_{PDCCH}^{total,slot,\mu})$, and using $\lfloor \alpha \cdot \min(C_{PDCCH}^{max,slot,\mu}, C_{PDCCH}^{total,slot,\mu}) \rfloor$ instead of $\min(C_{PDCCH}^{max,slot,\mu}, C_{PDCCH}^{total,slot,\mu})$ for the primary cell.

The UE can apply DCI size alignment as subsequently described.

If necessary, padding or truncation maybe applied to the DCI formats according to the following steps executed in the order as shown in TABLE 1.

TABLE 1

| Steps for the DCI format |
|---|

Step 0:
- Determine DCI format 0_0 monitored in a common search space according to 3GPP standard specification where $N_{RB}^{UL,BWP}$ is the size of the initial UL bandwidth part.
- Determine DCI format 1_0 monitored in a common search space according to 3GPP standard specification where $N_{RB}^{DL,BWP}$ is given by
  - the size of CORESET 0 if CORESET 0 is configured for the cell; and
  - the size of initial DL bandwidth part if CORESET 0 is not configured for the cell.
- If DCI format 0_0 is monitored in common search space and if the number of information bits in the DCI format 0_0 prior to padding is less than the payload size of the DCI format 1_0 monitored in common search space for scheduling the same serving cell, a number of zero padding bits are generated for the DCI format 0_0 until the payload size equals that of the DCI format 1_0.
- If DCI format 0_0 is monitored in common search space and if the number of information bits in the DCI format 0_0 prior to truncation is larger than the payload size of the DCI format 1_0 monitored in common search space for scheduling the same serving cell, the bitwidth of the frequency domain resource assignment field in the DCI format 0_0 is reduced by truncating the first few most significant bits such that the size of DCI format 0_0 equals the size of the DCI format 1_0.

Step 1:
- Determine DCI format 0_0 monitored in a UE-specific search space according to 3GPP standard specification where $N_{RB}^{UL,BWP}$ is the size of the active UL bandwidth part.
- Determine DCI format 1_0 monitored in a UE-specific search space according to 3GPP standard specification where $N_{RB}^{DL,BWP}$ is the size of the active DL bandwidth part.
- For a UE configured with supplementaryUplink in ServingCellConfig in a cell, if PUSCH is configured to be transmitted on both the SUL and the non-SUL of the cell and if the number of information bits in DCI format 0_0 in UE-specific search space for the SUL is not equal to the number of information bits in DCI format 0_0 in UE-specific search space for the non-SUL, a number of zero padding bits are generated for the smaller DCI format 0_0 until the payload size equals that of the larger DCI format 0_0.
- If DCI format 0_0 is monitored in UE-specific search space and if the number of information bits in the DCI format 0_0 prior to padding is less than the payload size of the DCI format 1_0 monitored in UE-specific search space for scheduling the same serving

TABLE 1-continued

| Steps for the DCI format |
| --- | cell, a number of zero padding bits are generated for the DCI format 0__0 until the payload size equals that of the DCI format 1__0.
- If DCI format 1__0 is monitored in UE-specific search space and if the number of information bits in the DCI format 1__0 prior to padding is less than the payload size of the DCI format 0__0 monitored in UE-specific search space for scheduling the same serving cell, zeros maybe appended to the DCI format 1__0 until the payload size equals that of the DCI format 0__0

Step 2:
- Determine DCI format 0__1 monitored in a UE-specific search space according to 3GPP standard specification.
- Determine DCI format 1__1 monitored in a UE-specific search space according to 3GPP standard specification.
- For a UE configured with supplementaryUplink in ServingCellConfig in a cell, if PUSCH is configured to be transmitted on both the SUL and the non-SUL of the cell and if the number of information bits in format 0__1 for the SUL is not equal to the number of information bits in format 0__1 for the non-SUL, zeros maybe appended to smaller format 0__1 until the payload size equals that of the larger format 0__1.
- If the size of DCI format 0__1 monitored in a UE-specific search space equals that of a DCI format 0__0/1__0 monitored in another UE-specific search space, one bit of zero padding maybe appended to DCI format 0__1.
- If the size of DCI format 1__1 monitored in a UE-specific search space equals that of a DCI format 0__0/1__0 monitored in another UE-specific search space, one bit of zero padding maybe appended to DCI format 1__1.

Step 2A:
- Determine DCI format 0__2 monitored in a UE-specific search space according to 3GPP standard specification.
- Determine DCI format 1__2 monitored in a UE-specific search space according to 3GPP standard specification.
- For a UE configured with supplementaryUplink in ServingCellConfig in a cell, if PUSCH is configured to be transmitted on both the SUL and the non-SUL of the cell and if the number of information bits in format 0__2 for the SUL is not equal to the number of information bits in format 0__2 for the non-SUL, zeros maybe appended to smaller format 0__2 until the payload size equals that of the larger format 0__2.

Step 3:
- If both of the following conditions are fulfilled the size alignment procedure is complete
  - the total number of different DCI sizes configured to monitor is no more than 4 for the cell
  - the total number of different DCI sizes with C-RNTI configured to monitor is no more than 3 for the cell Step 4:
- Otherwise
  Step 4A:
  - Remove the padding bit (if any) introduced in step 2 above.
  - Determine DCI format 1__0 monitored in a UE-specific search space according to 3GPP standard specification where $N_{RB}^{DL,BWP}$ is given by
    - the size of CORESET 0 if CORESET 0 is configured for the cell; and
    - the size of initial DL bandwidth part if CORESET 0 is not configured for the cell.
  - Determine DCI format 0__0 monitored in a UE-specific search space according to 3GPP standard specification where $N_{RB}^{UL,BWP}$ is the size of the initial UL bandwidth part.
  - If the number of information bits in the DCI format 0__0 monitored in a UE-specific search space prior to padding is less than the payload size of the DCI format 1__0 monitored in UE-specific search space for scheduling the same serving cell, a number of zero padding bits are generated for the DCI format 0__0 monitored in a UE-specific search space until the payload size equals that of the DCI format 1__0 monitored in a UE-specific search space.
  - If the number of information bits in the DCI format 0__0 monitored in a UE-specific search space prior to truncation is larger than the payload size of the DCI format 1__0 monitored in UE-specific search space for scheduling the same serving cell, the bitwidth of the frequency domain resource assignment field in the DCI format 0__0 is reduced by truncating the first few most significant bits such that the size of DCI format 0__0 monitored in a UE-specific search space equals the size of the DCI format 1__0 monitored in a UE-specific search space.
  Step 4B:
  - If the total number of different DCI sizes configured to monitor is more than 4 for the cell after applying the above steps, or if the total number of different DCI sizes with C-RNTI configured to monitor is more than 3 for the cell after applying the above steps
    - If the number of information bits in the DCI format 0__2 prior to padding is less than the payload size of the DCI format 1__2 for scheduling the same serving cell, a number of zero padding bits are generated for the DCI format 0__2 until the payload size equals that of the DCI format 1__2.
    - If the number of information bits in the DCI format 1__2 prior to padding is less than the payload size of the DCI format 0__2 for scheduling the same serving cell, zeros maybe appended to the DCI format 1__2 until the payload size equals that of the DCI format 0__2.
  Step 4C:
  - If the total number of different DCI sizes configured to monitor is more than 4 for the cell after applying the above steps, or if the total number of different DCI sizes with C-RNTI configured to monitor is more than 3 for the cell after applying the above steps TABLE 1-continued

| Steps for the DCI format |
|---|
| -    If the number of information bits in the DCI format 0_1 prior to padding is less than the payload size of the DCI format 1_1 for scheduling the same serving cell, a number of zero padding bits are generated for the DCI format 0_1 until the payload size equals that of the DCI format 1_1.<br>-    If the number of information bits in the DCI format 1_1 prior to padding is less than the payload size of the DCI format 0_1 for scheduling the same serving cell, zeros maybe appended to the DCI format 1_1 until the payload size equals that of the DCI format 0_1. |

The UE is not expected to handle a configuration that, after applying the above steps, results in: (1) the total number of different DCI sizes configured to monitor is more than 4 for the cell; (2) the total number of different DCI sizes with C-RNTI configured to monitor is more than 3 for the cell; (3) the size of DCI format 0_0 in a UE-specific search space is equal to DCI format 0_1 in another UE-specific search space; (4) the size of DCI format 1_0 in a UE-specific search space is equal to DCI format 1_1 in another UE-specific search space; (5) the size of DCI format 0_0 in a UE-specific search space is equal to DCI format 0_2 in another UE-specific search space when at least one pair of the corresponding PDCCH candidates of DCI formats 0_0 and 0_2 are mapped to the same resource; (6) the size of DCI format 1_0 in a UE-specific search space is equal to DCI format 1_2 in another UE-specific search space when at least one pair of the corresponding PDCCH candidates of DCI formats 1_0 and 1_2 are mapped to the same resource; (7) the size of DCI format 0_1 in a UE-specific search space is equal to DCI format 0_2 in the same or another UE-specific search space when at least one pair of the corresponding PDCCH candidates of DCI formats 0_1 and 0_2 are mapped to the same resource; or (8) the size of DCI format 1_1 in a UE-specific search space is equal to DCI format 1_2 in the same or another UE-specific search space when at least one pair of the corresponding PDCCH candidates of DCI formats 1_1 and 1_2 are mapped to the same resource.

If DCI format 3_0 or DCI format 3_1 is monitored on a cell, DCI size alignment for DCI format 3_0 and DCI format 31 is performed as described in 3GPP standard specification after performing the DCI size alignment described in 3GPP standard specification. The size(s) of the DCI formats configured to monitor for a cell in 3GPP standard specification refers to that after performing the DCI size alignment described in 3GPP standard specification.

If DCI format 3_0 or DCI format 3_1 is monitored on a cell and the total number of DCI sizes of the DCI formats configured to monitor for the cell and DCI format 3_0 or DCI format 3_1 is more than 4, zeros maybe appended to DCI format 3_0 if configured and DCI format 3_1 if configured, until the payload size of DCI format 3_0 or DCI format 31 equals that of the smallest DCI format configured to monitor for the cell that is larger than DCI format 3_0 or DCI format 3_1.

The UE is not expected to handle a configuration that results in: (1) the total number of different DCI sizes configured to monitor for the cell and DCI format 3_0 or DCI format 3_1 is more than 4; and (2) the payload size of DCI format 3_0 or DCI format 3_1 is larger than the payload size of all other DCI formats configured to monitor for the cell.

For a UE configured with scheduling on the primary cell from an SCell, if prior to padding the number of information bits in DCI format 0_1 carried by PDCCH on the primary cell is not equal to the number of information bits in DCI format 0_1 carried by PDCCH on the SCell for scheduling on the primary cell, zeros maybe appended to the DCI format 0_1 with smaller size until the payload size is the same.

For a UE configured with scheduling on the primary cell from an SCell, if prior to padding the number of information bits in DCI format 0_2 carried by PDCCH on the primary cell is not equal to the number of information bits in DCI format 0_2 carried by PDCCH on the SCell for scheduling on the primary cell, zeros maybe appended to the DCI format 0_2 with smaller size until the payload size is the same.

For a UE configured with scheduling on the primary cell from an SCell, if prior to padding the number of information bits in DCI format 1_1 carried by PDCCH on the primary cell is not equal to the number of information bits in DCI format 1_1 carried by PDCCH on the SCell for scheduling on the primary cell, zeros maybe appended to the DCI format 1_1 with smaller size until the payload size is the same.

For a UE configured with scheduling on the primary cell from an SCell, if prior to padding the number of information bits in DCI format 1_2 carried by PDCCH on the primary cell is not equal to the number of information bits in DCI format 1_2 carried by PDCCH on the SCell for scheduling on the primary cell, zeros maybe appended to the DCI format 1_2 with smaller size until the payload size is the same.

In one embodiment, for a UE configured with scheduling from an SCell on a PCell (in addition to self-scheduling on the PCell), for simultaneous fulfillment of: (1) the "3+1" DCI size budget for the PCell, and (2) size alignment for a same DCI format for scheduling on the PCell being provided by PDCCH receptions on the PCell or the SCell, such as DCI format 0_1/1_1/0_2/1_2, the UE first size matches DCI formats (associated with USS sets) on the two scheduling cells (PCell and SCell) for scheduling on the PCell, and then, when needed in order to achieve the "3+1" DCI size budget for the PCell, a same zero-padding applies to a same DCI format, such as DCI format 0_1 or DCI format 1_1, on the PCell and the SCell for scheduling on the PCell in order to align corresponding sizes of the DCI format on the PCell and the SCell for scheduling on the PCell with another DCI format on the PCell and the SCell for scheduling on the PCell.

When a UE monitors PDCCHs for detection of DCI formats 2_x on the primary cell, where x is from 0 to 7, as described in TS 38.212, the UE considers the primary cell as a scheduled cell and counts the sizes of the DCI formats 2_x towards the predetermined limit of "3+1" sizes of DCI formats that the UE can decode per scheduled cell. The UE is configured with scheduling from the SCell on the PCell when the UE is provided USS sets on the SCell to monitor PDCCHs with DCI formats scheduling PDSCH receptions or PUSCH transmissions on the PCell.

For example, the UE: (1) aligns DCI format 0_1 on the PCell and on the SCell for scheduling PUSCH transmissions on the PCell, (2) if a total number of sizes of DCI formats for scheduling on the PCell is larger than "3+1," including DCI formats 2_x, where x is from 0 to 7, with CRC that is not scrambled by a C-RNTI/MCS-C-RNTI/CS-RNTI as described in TS 38.212, the UE to aligns the sizes of DCI format 0_1 and DCI format 1_1, for example by applying applies zero padding to both DCI format 0_1 on the PCell and DCI format 0_1 on the SCell.

For example, the UE: (1) aligns DCI format 1_2 on the PCell and on the SCell for scheduling PDSCH receptions on the PCell, and (2) if a total number of sizes of DCI formats for scheduling on the PCell is larger than "3+1," including DCI formats 2_x, where x is from 0 to 7, with CRC that is not scrambled by a C-RNTI/MCS-C-RNTI/CS-RNTI as described in TS 38.212, the UE aligns the sizes of DCI format 1_2 and DCI format 0_2, for example by applying zero padding to both DCI format 1_2 on the PCell and DCI format 1_2 on the SCell.

The present embodiment can apply to any scheduled cell, including any SCell, that is configured to be scheduled by two or multiple scheduling cells, including self-scheduling or cross-carrier scheduling.

FIG. 6 illustrates a flowchart of procedure 600 for a UE to align sizes of DCI formats used for scheduling on the primary cell from the primary cell or from a secondary cell when the UE monitors PDCCH for detection of more than "3+1" DCI format sizes according to embodiments of the present disclosure. The procedure 600 as may be performed by a UE (e.g., 111-116 as illustrated in FIG. 1). An embodiment of the procedure 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

As illustrated in FIG. 6, a UE is configured for scheduling on the primary cell from the primary cell and from a secondary cell, 610. The UE aligns a size for a DCI format (e.g., 0_2) for scheduling on the primary cell from the primary cell and for a same DCI format for scheduling on the primary cell from the secondary cell, 620. The UE determines that zeros maybe appended to the first DCI format (e.g., 0_2) for scheduling from the primary cell on the primary cell in order to obtain a same size as a size of a second DCI format (e.g., 1_2) for scheduling from the secondary cell on the primary cell, in order to achieve a predetermined number of sizes for DCI formats used for scheduling on the primary cell, 630. The UE applies the zero padding to both the first DCI format (e.g., 0_2) for scheduling on the primary cell from the primary cell and the same DCI format for scheduling on the primary cell from the secondary cell, 640.

In one example, the above UE behavior can be implemented in the specifications as below.

For a UE configured with scheduling on the primary cell from an SCell, if prior to padding the number of information bits in DCI format 0_1 carried by PDCCH on the primary cell is not equal to the number of information bits in DCI format 0_1 carried by PDCCH on the SCell for scheduling on the primary cell, zeros maybe appended to the DCI format 0_1 with smaller size until the payload size is the same.

If application of step 4C in 3GPP standard specification results in additional zero padding for DCI format 0_1 for scheduling on the primary cell, corresponding zeros maybe appended to both DCI format 0_1 monitored on the primary cell and DCI format 0_1 monitored on the SCell for scheduling on the primary cell.

Similar text can apply for DCI format 1_1. Similar text can apply for DCI formats 0_2 and 1_2, wherein step 4C may be replaced with step 4B.

In another example, the above UE behavior can be implemented in the specifications as below.

For a UE configured with scheduling on the primary cell from an SCell, if prior to padding or after the padding, the number of information bits in DCI format 0_1 carried by PDCCH on the primary cell is not equal to the number of information bits in DCI format 0_1 carried by PDCCH on the SCell for scheduling on the primary cell, zeros maybe appended to the DCI format 0_1 with smaller size until the payload size is the same.

Similar text can apply for DCI formats 1_1, 0_2, and 1_2.

In one embodiment, for a UE configured with scheduling from an SCell on the PCell and the SCell is deactivated for the UE or the UE has a dormant active DL BWP on the SCell, the UE determines a size alignment procedure for DCI formats scheduling on the PCell based on a reference DL BWP on the SCell. The reference BWP on the SCell can be a first active DL BWP, or a first outside-active-time BWP or a first within-active-time BWP, or an initial DL BWP, or a default BWP, and so on. The reference BWP can be same or different for the case of SCell deactivation for the UE compared to the case that an active DL BWP on the SCell is a dormant DL BWP for the UE.

In one example, for a UE configured with scheduling from an SCell on the PCell, when the SCell is a deactivated serving cell for the UE, the UE determines a size of a DCI format (associated with USS sets) on the SCell for scheduling on the PCell based on information provided by one of the following: (1) a first active DL BWP; (2) an initial DL BWP; (3) a default DL BWP; (4) a lowest index (or highest index) DL BWP; (5) a latest active DL BWP before SCell deactivation; or (6) a reference DL BWP that is indicated by higher layers of the SCell.

In another example, for a UE configured with scheduling from an SCell on the PCell, when an active DL BWP of the SCell is a dormant BWP, the UE determines a size of a DCI format (associated with USS sets) on the SCell for scheduling on the PCell based on information provided by one of the following: (1) a firstOutsideActiveTimeBWP; (2) afirstWithinActiveTimeBWP; (3) a first active DL BWP; (4) an initial DL BWP; (5) a default DL BWP; (6) a lowest index (or highest index) DL BWP; (7) a latest active DL BWP before changing to a dormant DL BWP on the SCell; or (8) a reference DL BWP that is indicated by higher layers of the SCell.

FIG. 7 illustrates a flowchart of procedure 700 for a UE to determine a size of a DCI format used for scheduling on the PCell via PDCCH receptions on an SCell when the SCell is deactivated for the UE or the UE has a dormant active DL BWP on the SCell according to embodiments of the present disclosure. The procedure 700 as may be performed by a UE (e.g., 111-116 as illustrated in FIG. 1). An embodiment of the procedure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

A UE is configured for scheduling on the primary cell from the primary cell and from a secondary cell, 710. The UE is indicated that the secondary cell is a deactivated serving cell or the UE changes an active DL BWP on the secondary cell to a dormant DL BWP, 720. The UE determines a DCI format for scheduling on the primary cell from the secondary cell based on information for a reference DL BWP of the secondary cell, 730. The UE performs an alignment procedure to obtain a same size for the DCI format for scheduling on the primary cell from the secondary cell and for the DCI format for scheduling on the primary cell from the primary cell, 740.

In one example, the above UE behavior can be implemented in the specifications as below.

For a UE configured with scheduling on the primary cell from an SCell, if prior to padding the number of information bits in DCI format 0_1 carried by PDCCH on the primary cell is not equal to the number of information bits in DCI format 0_1 carried by PDCCH on the SCell for scheduling on the primary cell, zeros maybe appended to the DCI format 0_1 with smaller size until the payload size is the same.

If the SCell is deactivated, the UE determines the number of information bits in DCI format 0_1 carried by PDCCH on the primary cell based on a configuration provided by a first active DL BWPfirstActiveDownlinkBWP-Id of the SCell. If the active DL BWP of the SCell is a dormant DL BWP, the UE determines the number of information bits in DCI format 0_1 carried by PDCCH on the primary cell based on a configuration provided by a DL BWP firstOutsideActiveTimeBWP [or maybe firstWithinActiveTimeBWP] of the SCell.

Similar text can apply for DCI formats 1_1, 0_2, and 1_2.

In an alternative realization, a UE does not consider DCI formats associated with search space sets for PDCCH receptions on the SCell for scheduling on the PCell when the SCell is deactivated for the UE or when the UE has a dormant active DL BWP on the SCell.

A cross-cell "3+1" DCI size alignment as described in the present disclosure may not be performed by a UE when the UE indicates a capability to monitor PDCCH according to USS sets on the PCell and the SCell for scheduling on the PCell only in different slots. The UE may also additionally indicate a capability for not having to perform cross-cell DCI size alignment when the UE monitors PDCCH according to USS sets on the PCell and the SCell for scheduling on the PCell only in different slots.

The present disclosure enables an improved operation of 3GPP 5G NR system by enhancing the CA operation. The embodiments are generic and can also apply to various frequency bands in different frequency ranges (FR) such as FR1, FR2, FR3, and FR4, e.g., low frequency bands such as below 1 GHz, mid frequency bands, such as 1-7 GHz, and high/millimeter frequency bands, such as 24-100 GHz and beyond. In addition, the embodiments are generic and can apply to various use cases and settings as well, such as single-panel UEs and multi-panel UEs, eMBB, URLLC and IIoT, mMTC and IoT, sidelink/V2X, operation with multi-TRP/beam/panel, operation in unlicensed/shared spectrum (NR-U), non-terrestrial networks (NTN), aerial systems such as drones, operation with reduced capability (RedCap) UEs, private or non-public networks (NPN), and so on.

The present disclosure relates to a pre-5G or 5G or beyond 5G communication system to be provided for supporting one or more of: higher data rates, lower latency, higher reliability, improved coverage, and massive connectivity, and so on. Various embodiments apply to UEs operating with other RATs and/or standards, such as different releases/generations of 3GPP standards (including beyond 5G, 5G Advanced, 6G, and so on), IEEE standards (such as 802.16 WiMAX and 802.11 Wi-Fi and so on), and so forth.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
    receiving:
        first information for first fields of a first downlink control information (DCI) format in response to a first physical downlink control channel (PDCCH) reception providing the first DCI format being on a primary cell (PCell), and
        second information for second fields of the first DCI format in response to a second PDCCH reception providing the first DCI format being on a secondary cell (SCell), wherein the first DCI format schedules a physical uplink shared channel (PUSCH) transmission on the PCell;
    determining:
        a first size for the first DCI format in response to the first PDCCH reception providing the first DCI format being on the PCell,
        a second size for the first DCI format in response to the second PDCCH reception providing the first DCI format being on the SCell, wherein, in response to the SCell being deactivated, the second size is determined based on a first reference downlink (DL) bandwidth part (BWP) for the SCell, and
        a first number of padding bits equal to an absolute difference between the first size and the second size; and
    receiving:
        the first DCI format in the first PDCCH reception on the PCell, wherein, in response to the first size being smaller than the second size, the first DCI format includes the first number of padding bits appended to a number of bits for the first fields, or
        the first DCI format in the second PDCCH reception on the SCell, wherein, in response to the second size being smaller than the first size, the first DCI format includes the first number of padding bits appended to a number of bits for the second fields.

2. The method of claim 1, wherein the first reference DL BWP is a first active DL BWP for the SCell after activation of the SCell.

3. The method of claim 1, wherein, when an active DL BWP on the SCell is a dormant DL BWP, the second size is determined based on a second reference DL BWP for the SCell.

4. The method of claim 3, wherein the second reference DL BWP for the SCell is a first active DL BWP for the SCell after switching from a dormant DL BWP for the SCell.

5. The method of claim 1, further comprising determining:

a third size for a second DCI format, wherein:

the second DCI format schedules a physical downlink shared channel (PDSCH) reception on the PCell, the second DCI format is provided by a third PDCCH reception on the PCell or by a fourth PDCCH reception on the SCell, and the first size and the second size are smaller than the third size; and a second number of padding bits that is equal to an absolute difference between the third size and the larger of the first size and the second size, wherein, in response to the first size being smaller than the second size, the first DCI format includes:

the second number of padding bits appended to the first number of padding bits and to the number of bits of the first fields for the first PDCCH reception on the PCell, or the second number of padding bits appended to the number of bits of the second fields for the second PDCCH reception on the SCell.

6. The method of claim 5, wherein, in response to the second size being smaller than the first size, the first DCI format includes:

the second number of padding appended bits to the number of bits for the first fields for the first PDCCH reception on the PCell, or the second number of padding bits appended to the first number of padding bits and to the number of bits for the second fields for the second PDCCH reception on the SCell.

7. The method of claim 5, wherein:

the first DCI format is a DCI format 0_1 and the second DCI format is a DCI format 1_1, or the first DCI format is a DCI format 0_2 and the second DCI format is a DCI format 1_2.

8. A user equipment (UE) comprising:

a transceiver configured to receive:

first information for first fields of a first downlink control information (DCI) format when a first physical downlink control channel (PDCCH) reception providing the first DCI format is on a primary cell (PCell), and second information for second fields of the first DCI format when a second PDCCH reception providing the first DCI format is on a secondary cell (SCell), wherein the first DCI format schedules a physical uplink shared channel (PUSCH) transmission on the PCell; and a processor operably connected to the transceiver, the processor configured to determine:

a first size for the first DCI format when the first PDCCH reception providing the first DCI format is on the PCell, a second size for the first DCI format when the second PDCCH reception providing the first DCI format is on the SCell, wherein, when the SCell is deactivated, the second size is determined based on a first reference downlink (DL) bandwidth part (BWP) for the SCell, and a first number of padding bits equal to an absolute difference between the first size and the second size, wherein the transceiver is further configured to receive:

the first DCI format in the first PDCCH reception on the PCell, wherein, when the first size is smaller than the second size, the first DCI format includes the first number of padding bits appended to a number of bits for the first fields, or the first DCI format in the second PDCCH reception on the SCell, wherein, when the second size is smaller than the first size, the first DCI format includes the first number of padding bits appended to a number of bits for the second fields.

9. The UE of claim 8, wherein the first reference DL BWP is a first active DL BWP for the SCell after activation of the SCell.

10. The UE of claim 8, wherein, when an active DL BWP on the SCell is a dormant DL BWP, the second size is determined based on a second reference DL BWP for the SCell.

11. The UE of claim 10, wherein the second reference DL BWP for the SCell is a first active DL BWP for the SCell after switching from a dormant DL BWP for the SCell.

12. The UE of claim 8, wherein:

the processor is further configured to determine:

a third size for a second DCI format, and a second number of padding bits that is equal to an absolute difference between the third size and the larger of the first size and the second size;

the first size and the second size are smaller than the third size;

the second DCI format schedules a physical downlink shared channel (PDSCH) reception on the PCell;

the second DCI format is provided by a third PDCCH reception on the PCell or by a fourth PDCCH reception on the SCell; and when the first size is smaller than the second size, the first DCI format includes:

the second number of padding bits appended to the first number of padding bits and to the bits of the first fields for the first PDCCH reception on the PCell, or the second number of padding bits appended to the bits of the second fields for the second PDCCH reception on the SCell.

13. The UE of claim 12, wherein, when the second size is smaller than the first size, the first DCI format includes:

the second number of padding bits appended to the number of bits for the first fields for the first PDCCH reception on the PCell, or the second number of padding bits appended to the first number of padding bits and to the number of bits for the second fields for the second PDCCH reception on the SCell.

14. The UE of claim 12, wherein:

the first DCI format is a DCI format 0_1 and the second DCI format is a DCI format 1_1, or the first DCI format is a DCI format 0_2 and the second DCI format is a DCI format 1_2.

15. A base station comprising:

a transceiver configured to transmit:

first information for first fields of a first downlink control information (DCI) format when a first physical downlink control channel (PDCCH) transmission providing the first DCI format is on a primary cell (PCell), and second information for second fields of the first DCI format when a second PDCCH transmission providing the first DCI format is on a secondary cell (SCell), wherein the first DCI format schedules a physical uplink shared channel (PUSCH) reception on the PCell; and a processor operably connected to the transceiver, the processor configured to determine:
    a first size for the first DCI format when the first PDCCH transmission providing the first DCI format is on the PCell,
    a second size for the first DCI format when the second PDCCH transmission providing the first DCI format is on the SCell, wherein, when the SCell is deactivated, the second size is determined based on a first reference downlink (DL) bandwidth part (BWP) for the SCell, and
    a first number of padding bits equal to an absolute difference between the first size and the second size,
wherein the transceiver is further configured to transmit:
    the first DCI format in the first PDCCH transmission on the PCell, wherein, when the first size is smaller than the second size, the first DCI format includes the first number of padding bits appended to a number of bits for the first fields, or
    the first DCI format in the second PDCCH transmission on the SCell, wherein, when the second size is smaller than the first size, the first DCI format includes the first number of padding bits appended to a number of bits for the second fields.

16. The base station of claim 15, wherein the first reference DL BWP is a first active DL BWP for the SCell after activation of the SCell.

17. The base station of claim 15, wherein, when an active DL BWP on the SCell is a dormant DL BWP, the second size is determined based on a second reference DL BWP for the SCell.

18. The base station of claim 17, wherein the second reference DL BWP for the SCell is a first active DL BWP for the SCell after switching from a dormant DL BWP for the SCell.

19. The base station of claim 15, wherein:
the processor is further configured to determine:
    a third size for a second DCI format, and
    a second number of padding bits that is equal to an absolute difference between the third size and the larger of the first size and the second size;
the first size and the second size are smaller than the third size;
the second DCI format schedules a physical downlink shared channel (PDSCH) transmission on the PCell;
the second DCI format is provided by a third PDCCH transmission on the PCell or by a fourth PDCCH transmission on the SCell; and
when the first size is smaller than the second size, the first DCI format includes:
    the second number of padding bits appended to the first number of padding bits and to the bits of the first fields for the first PDCCH transmission on the PCell, or
    the second number of padding bits appended to the bits of the second fields for the second PDCCH transmission on the SCell; and
one of:
    the first DCI format is a DCI format 0_1 and the second DCI format is a DCI format 1_1, or
    the first DCI format is a DCI format 0_2 and the second DCI format is a DCI format 1_2.

20. The base station of claim 19, wherein, when the second size is smaller than the first size, the first DCI format includes:
    the second number of padding bits appended to the number of bits for the first fields for the first PDCCH transmission on the PCell, or
    the second number of padding bits appended to the first number of padding bits and to the number of bits for the second fields for the second PDCCH transmission on the SCell.

* * * * *